US012741464B2

(12) United States Patent
Yamasaki et al.

(10) Patent No.: US 12,741,464 B2
(45) Date of Patent: Sep. 22, 2026

(54) LIQUID EJECTING HEAD AND LIQUID EJECTING APPARATUS

(71) Applicant: SEIKO EPSON CORPORATION, Tokyo (JP)

(72) Inventors: Sosuke Yamasaki, Shiojiri (JP); Motoki Takabe, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 87 days.

(21) Appl. No.: 19/040,942

(22) Filed: Jan. 30, 2025

(65) Prior Publication Data

US 2025/0242593 A1 Jul. 31, 2025

(30) Foreign Application Priority Data

Jan. 31, 2024 (JP) ................................ 2024-012862

(51) Int. Cl.
*B41J 2/14* (2006.01)
*B41J 2/045* (2006.01)

(52) U.S. Cl.
CPC ....... *B41J 2/14233* (2013.01); *B41J 2/04581* (2013.01); *B41J 2002/14241* (2013.01); *B41J 2002/14491* (2013.01); *B41J 2202/11* (2013.01)

(58) Field of Classification Search
CPC ................ B41J 2/04581; B41J 2/14201; B41J 2/14233; B41J 2/14274; B41J 2002/11; B41J 2002/14241; B41J 2002/14362; B41J 2002/14491; H10N 30/2047; H10N 30/50; H10N 30/706; H10N 30/85
See application file for complete search history.

(56) References Cited

U.S. PATENT DOCUMENTS

2005/0068376 A1* 3/2005 Sugahara .............. B41J 2/1645 347/68
2012/0236082 A1* 9/2012 Akahane ............. B41J 2/14274 347/68
2021/0031519 A1 2/2021 Wanikawa
2021/0237441 A1* 8/2021 Uchida ................ B41J 2/14201
2021/0260875 A1* 8/2021 Naganuma ............... B41J 2/175

FOREIGN PATENT DOCUMENTS

JP 2021-020407 A 2/2021

* cited by examiner

*Primary Examiner* — Anh T Vo
(74) *Attorney, Agent, or Firm* — Harness, Dickey & Pierce, P.L.C.

(57) ABSTRACT

When the liquid ejecting head is viewed in plan, the piezoelectric body includes a first region overlapping with the first pressure compartment, a second region overlapping with a wall of the first recess, a third region overlapping with the second pressure compartment, and a fourth region overlapping with a wall of the second recess. The first region is located between the second region and the third region and is provided away from the second region. The third region is located between the first region and the fourth region and is provided away from the fourth region.

8 Claims, 14 Drawing Sheets

LIQUID EJECTING HEAD AND LIQUID EJECTING APPARATUS

The present application is based on, and claims priority from JP Application Serial Number 2024-012862, filed Jan. 31, 2024, the disclosure of which is hereby incorporated by reference herein in its entirety.

BACKGROUND

1. Technical Field

Embodiments of the present disclosure relate to a liquid ejecting head and a liquid ejecting apparatus.

2. Related Art

A liquid ejecting head that ejects liquid such as ink is widely known. For example, JP-A-2021-020407 discloses a liquid ejecting head that includes: a piezoelectric element that includes a piezoelectric body, an upper electrode, and a lower electrode; a pressure compartment that increases and decreases an internal pressure in accordance with driving of the piezoelectric element; a sealing plate in which a recess housing the piezoelectric element is provided; and a nozzle from which a liquid present inside the pressure compartment is ejected in accordance with an increase in the internal pressure of the pressure compartment.

However, in related art, when a liquid ejecting head is viewed in plan, a piezoelectric body is provided in such a way as to extend widely in a range from a region of overlapping with one of two walls of a recess provided in a sealing plate to a region of overlapping with the other of the two walls of the recess, in addition to a region of overlapping with a pressure compartment. For this reason, according to the related art, there is a possibility that vibration caused by driving of the piezoelectric element is transmitted via the piezoelectric body to the two walls of the recess, resulting in changing a relative positional relationship between the sealing plate and the piezoelectric body or changing a relative positional relationship between the pressure compartment substrate in which the pressure compartment is formed and the piezoelectric body.

SUMMARY

A liquid ejecting head according to a certain aspect of the present disclosure includes: a pressure compartment substrate in which a plurality of pressure compartments is provided, the plurality of pressure compartments including a first pressure compartment extending in a first direction and a second pressure compartment provided at a position different from a position of the first pressure compartment in the first direction and extending in the first direction; a plurality of piezoelectric elements disposed over the pressure compartment substrate and including a piezoelectric body, an upper electrode, and a lower electrode; and a sealing plate in which a first recess and a second recess are provided and which is disposed over the plurality of piezoelectric elements, the first recess housing a first piezoelectric element corresponding to the first pressure compartment among the plurality of piezoelectric elements, the second recess housing a second piezoelectric element corresponding to the second pressure compartment among the plurality of piezoelectric elements, wherein, when the liquid ejecting head is viewed in plan in a vertical direction, the piezoelectric body includes a first region overlapping with the first pressure compartment, a second region overlapping with one of two walls that the first recess includes in the first direction, a third region overlapping with the second pressure compartment, and a fourth region overlapping with one of two walls that the second recess includes in the first direction, in the first direction, the first region is located between the second region and the third region and is provided away from the second region, and in the first direction, the third region is located between the first region and the fourth region and is provided away from the fourth region.

A liquid ejecting apparatus according to a certain aspect of the present disclosure includes: a pressure compartment substrate in which a plurality of pressure compartments is provided, the plurality of pressure compartments including a first pressure compartment extending in a first direction and a second pressure compartment provided at a position different from a position of the first pressure compartment in the first direction and extending in the first direction; a plurality of piezoelectric elements disposed over the pressure compartment substrate and including a piezoelectric body, an upper electrode, and a lower electrode; and a sealing plate in which a first recess and a second recess are provided and which is disposed over the plurality of piezoelectric elements, the first recess housing a first piezoelectric element corresponding to the first pressure compartment among the plurality of piezoelectric elements, the second recess housing a second piezoelectric element corresponding to the second pressure compartment among the plurality of piezoelectric elements, wherein, when the liquid ejecting head is viewed in plan in a vertical direction, the piezoelectric body includes a first region overlapping with the first pressure compartment, a second region overlapping with one of two walls that the first recess includes in the first direction, a third region overlapping with the second pressure compartment, and a fourth region overlapping with one of two walls that the second recess includes in the first direction, in the first direction, the first region is located between the second region and the third region and is provided away from the second region, and in the first direction, the third region is located between the first region and the fourth region and is provided away from the fourth region.

DESCRIPTION OF EMBODIMENTS

Figure 1:
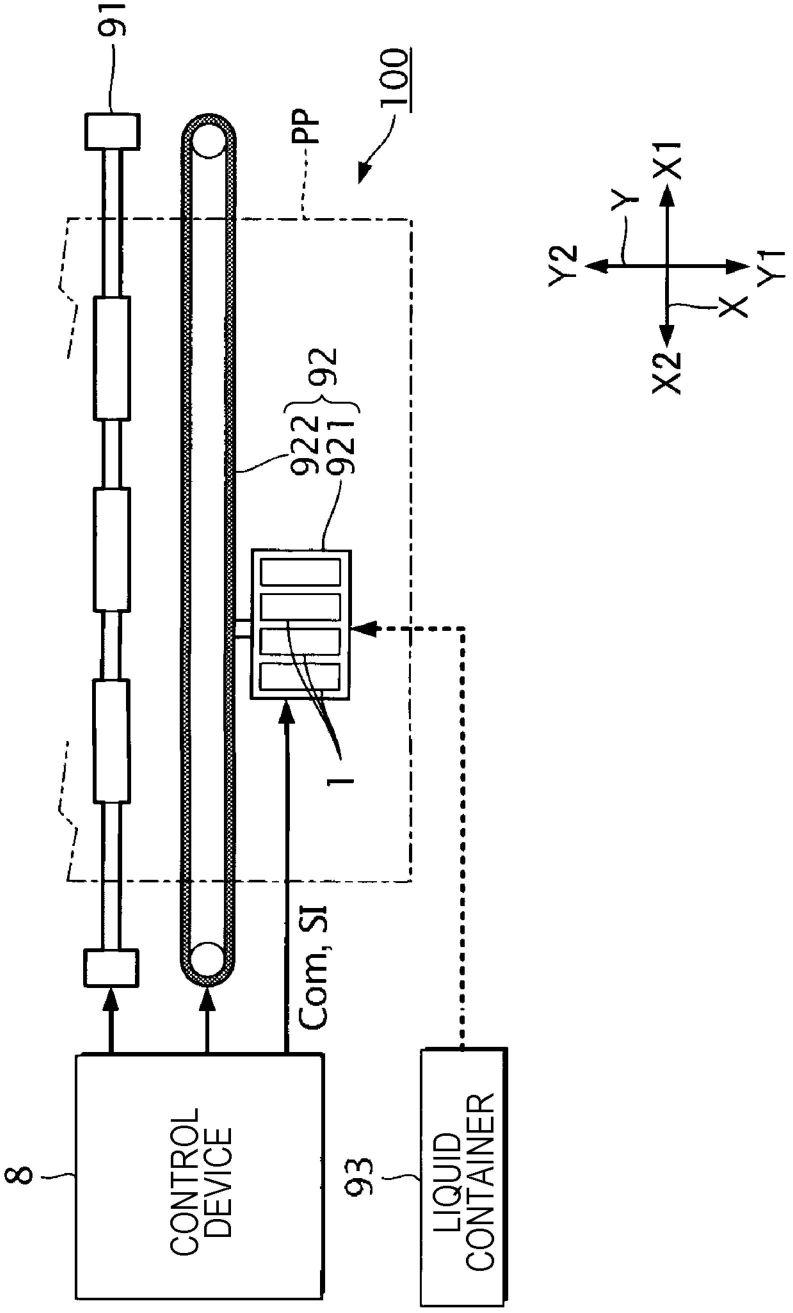
FIG. 1 is a configuration diagram illustrating an example of a liquid ejecting apparatus according to a first embodiment of the present disclosure.

With reference to the accompanying drawings, some embodiments of the present disclosure will now be described. In the drawings, however, the dimensions and scales of components may be made different as appropriate from those in actual implementation. Since the embodiments described below show some preferred examples of the present disclosure, they contain various technically-preferred limitations. However, the scope of the present disclosure shall not be construed to be limited to the examples described below unless and except where the description contains an explicit mention of an intent to limit the present disclosure.

A. FIRST EMBODIMENT

A liquid ejecting apparatus 100 according to a first embodiment will now be described.

A.1. Overview of Liquid Ejecting Apparatus

FIG. 1 is a diagram for explaining a liquid ejecting apparatus 100 according to a first embodiment.

The liquid ejecting apparatus 100 is an ink-jet printing apparatus that ejects ink onto a medium PP. A typical example of the medium PP is printing paper, but not limited thereto. Any target of printing such as a resin film or a cloth can be used as the medium PP.

As illustrated in FIG. 1, the liquid ejecting apparatus 100 includes a plurality of liquid ejecting heads 1, a control device 8, a transporting mechanism 91, a moving mechanism 92, and a liquid container 93.

The liquid container 93 contains ink, and supplies the ink contained therein to the liquid ejecting head 1. For example, a cartridge that can be detachably attached to the liquid ejecting apparatus 100, a bag-type ink pack made of a flexible film material, an ink tank that can be refilled with ink, or the like can be used as the liquid container 93. Several types of ink different in color from one another are contained in the liquid container 93. Ink is an example of a “liquid”.

The control device 8 includes, for example, a processing circuit such as a CPU or an FPGA, and a storage circuit such as a semiconductor memory, and controls various elements of the liquid ejecting apparatus 100. CPU is an acronym for Central Processing Unit. FPGA is an acronym for Field Programmable Gate Array.

Under the control of the control device 8, the transporting mechanism 91 transports the medium PP in a Y1 direction along a Y axis. In the description below, the Y1 direction, and a Y2 direction, which is the opposite of the Y1 direction, will be collectively referred to as “Y-axis direction”. In addition, in the description below, an X1 direction along an X axis, which intersects with the Y axis, and an X2 direction, which is the opposite of the X1 direction, will be collectively referred to as “X-axis direction”. In addition, in the description below, a Z1 direction along a Z axis, which intersects with the X axis and the Y axis, and a Z2 direction (an example of “upper direction”), which is the opposite of the Z1 direction, will be collectively referred to as “Z-axis direction” (an example of “vertical direction”). In the first embodiment, as an example, a case where the X, Y, and Z axes are orthogonal to one another is assumed. However, the scope of the present disclosure is not limited to this mode. It is sufficient as long as the X, Y, and Z axes intersect with one another.

Under the control of the control device 8, the moving mechanism 92 reciprocates the plurality of liquid ejecting heads 1 in the X1 direction and the X2 direction. The moving mechanism 92 includes a housing case 921, in which the plurality of liquid ejecting heads 1 is housed, and an endless belt 922, to which the housing case 921 is fixed. The liquid container 93 may be housed together with the liquid ejecting heads 1 in the housing case 921.

The control device 8 supplies, to the liquid ejecting head 1, a drive signal Com for driving the liquid ejecting head 1 and a control signal SI for controlling the liquid ejecting head 1. The liquid ejecting head 1 is driven by means of the drive signal Com under the control by means of the control signal SI. Ink is ejected in the Z1 direction from some or all of a plurality of nozzles N provided in the liquid ejecting head 1. That is, along with the transportation of the medium PP by the transporting mechanism 91 and the reciprocation of the liquid ejecting head 1 by the moving mechanism 92, the liquid ejecting head 1 ejects ink from some or all of the plurality of nozzles N to cause droplets of the ejected ink to land onto the surface of the medium PP, thereby forming a print-demanded image on the surface of the medium PP. The nozzles N will be described later with reference to FIGS. 2 and 3.

A.2. Overview of Liquid Ejecting Head

Figure 2:
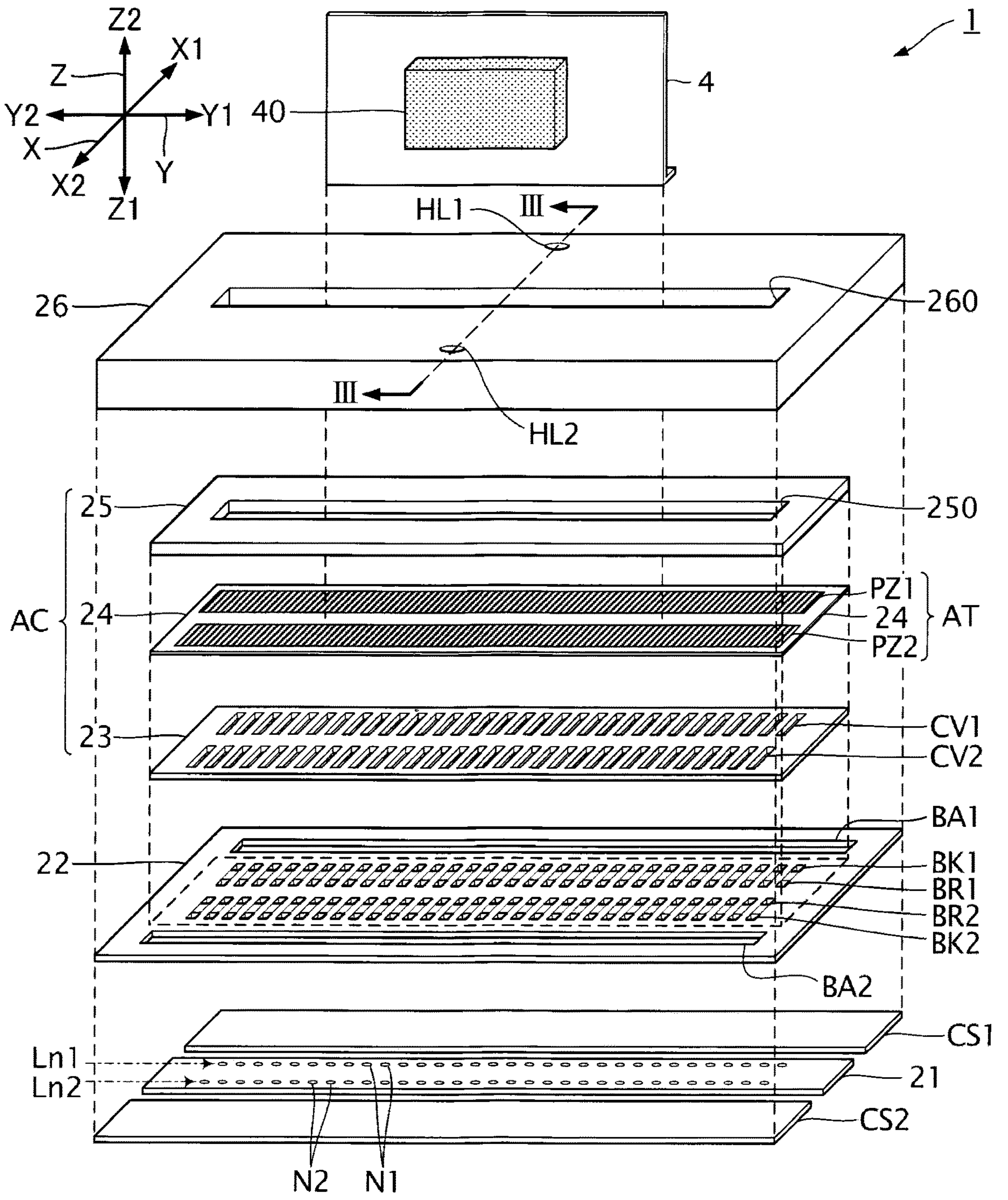
FIG. 2 is an exploded perspective view of an example of the configuration of a liquid ejecting head.
Figure 3:
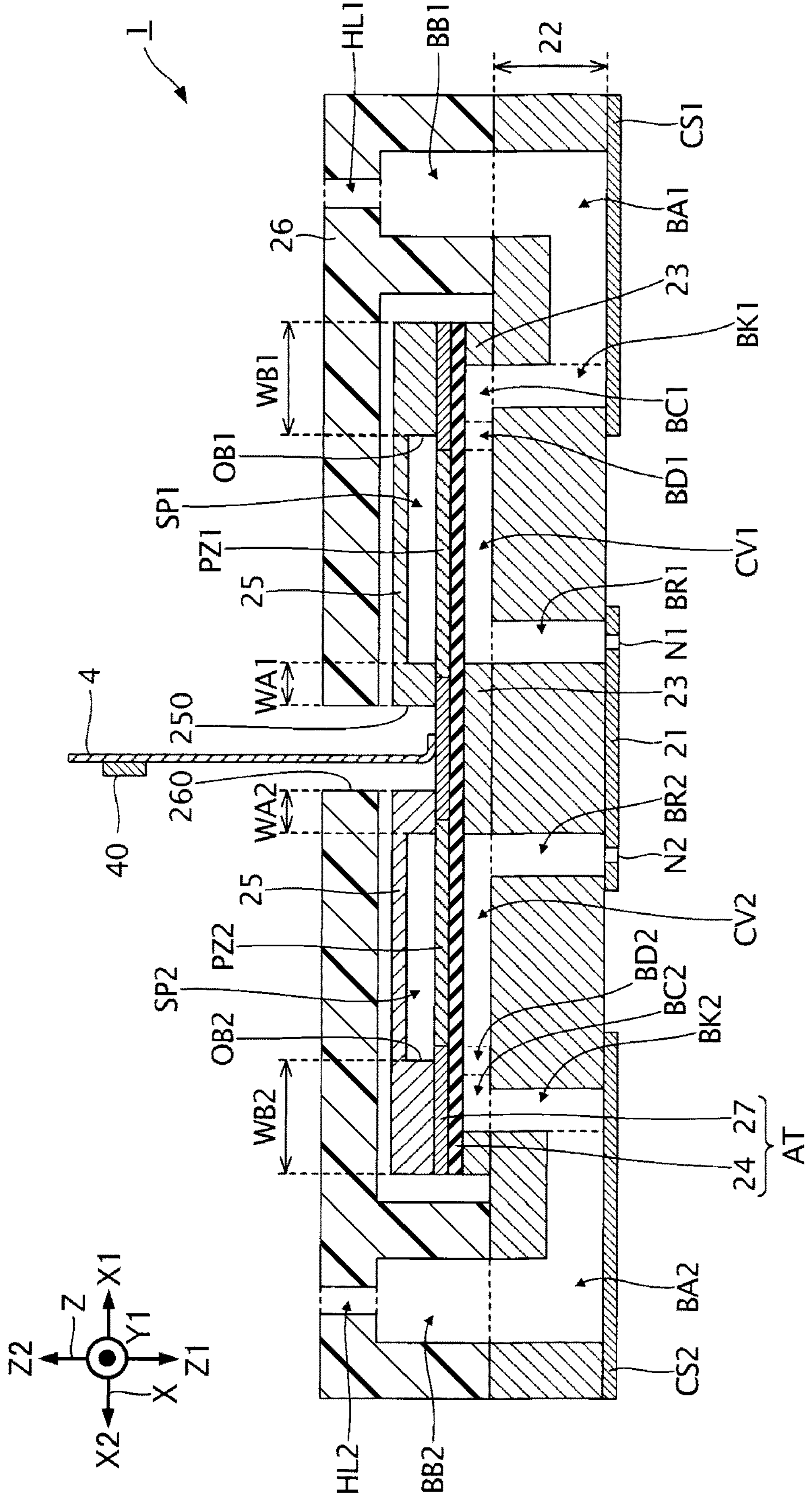
FIG. 3 is a close-sectional view of an example of the configuration of the liquid ejecting head.

With reference to FIGS. 2 and 3, an overview of the liquid ejecting head 1 is given below.

FIG. 2 is an exploded perspective view of the liquid ejecting head 1. FIG. 3 is a cross-sectional view taken along the line III-III of FIG. 2.

As illustrated in FIGS. 2 and 3, the liquid ejecting head 1 includes a nozzle substrate 21, compliance sheets CS1 and CS2, a communication plate 22, a pressure compartment substrate 23, a diaphragm 24, a sealing substrate 25, a flow passage forming substrate 26, and a piezoelectric structural body 27 including piezoelectric elements PZ. A configuration that includes the diaphragm 24 and the piezoelectric structural body 27 will be hereinafter referred to as “actuator substrate AT”. A configuration that includes the actuator substrate AT, the sealing substrate 25, and the pressure compartment substrate 23 will be hereinafter referred to as “actuator chip AC”.

As illustrated in FIG. 2, the nozzle substrate 21 is a plate-like member that has longer sides in the Y-axis direction and extends substantially in parallel with an X-Y plane. In the first embodiment, the nozzle substrate 21 is assumed to be manufactured by, for example, processing a monocrystalline silicon substrate by using a semiconductor manufacturing technology such as etching. Any known material and method, however, may be used for manufacturing the nozzle substrate 21.

In this specification, the concept of "substantially in parallel with" includes not only a case of being perfectly in parallel but also a case of being able to be deemed as parallel, with a margin of error taken into consideration. Specifically, the concept of "substantially in parallel with" includes a case of being able to be deemed as parallel, with a margin of error of 10% or so taken into consideration. In this specification, a phrase "substantially the same" or the like includes a case of being able to be deemed as the same, with a margin of error taken into consideration, similarly to "substantially in parallel with".

The nozzle substrate 21 has the plurality of nozzles N formed therein. The nozzle N mentioned here is a through hole provided in the nozzle substrate 21. In the first embodiment, the following case is assumed: the plurality of nozzles N formed in the nozzle substrate 21 includes a plurality of nozzles N1 arranged in such a way as to extend in the Y-axis direction and a plurality of nozzles N2 arranged at X2-side positions as viewed from the plurality of nozzles N1 in such a way as to extend in the Y-axis direction. The plurality of nozzles N1 extending in the Y-axis direction will be hereinafter referred to as "nozzle row Ln1", and the plurality of nozzles N2 extending in the Y-axis direction will be hereinafter referred to as "nozzle row Ln2". The nozzle row Ln1 and the nozzle row Ln2 will sometimes be hereinafter collectively referred to as "nozzle row Ln".

In the first embodiment, the following case is assumed: among components of the liquid ejecting head 1, those corresponding to the nozzle row Ln1 and those corresponding to the nozzle row Ln2 are disposed substantially with a plane symmetry with respect to a plane whose normal-line direction is the X-axis direction. Therefore, a description will be given below while focusing on, among components of the liquid ejecting head 1, those corresponding to the nozzle row Ln1, and a description about those corresponding to the nozzle row Ln2 will be omitted where appropriate.

As illustrated in FIGS. 2 and 3, the communication plate 22 is provided at a Z2-side position (over) as viewed from the nozzle substrate 21. The communication plate 22 is a plate-like member that has longer sides in the Y-axis direction and extends substantially in parallel with the X-Y plane. In the first embodiment, the communication plate 22 is assumed to be manufactured by, for example, processing a monocrystalline silicon substrate by using a semiconductor manufacturing technology. Any known material and method, however, may be used for manufacturing the communication plate 22.

Passages through which ink flows are formed in the communication plate 22. Specifically, in the communication plate 22, one supply flow passage BA1 is formed correspondingly for the nozzle row Ln1 in such a way as to extend in the Y-axis direction. In addition, in the communication plate 22, a plurality of connection flow passages BK1 corresponding to the plurality of nozzles N1, and a plurality of communication flow passages BR1 corresponding to the plurality of nozzles N1, are formed correspondingly for the nozzle row Ln1. The connection flow passages BK1 are in communication with the supply flow passage BA1 and are provided in such a way as to extend in the Z-axis direction at X2-side positions as viewed from the supply flow passage BA1. The communication flow passages BR1 are provided in such a way as to extend in the Z-axis direction at X2-side positions as viewed from the connection flow passages BK1. Each of the communication flow passages BR1 is in communication with the corresponding one of the nozzles N1, that is, the one to which this communication flow passage BR1 corresponds.

In the communication plate 22, one supply flow passage BA2, which is an element symmetrical to the one supply flow passage BA1, a plurality of connection flow passages BK2, which is a plurality of elements symmetrical to the plurality of connection flow passages BK1, and a plurality of communication flow passages BR2, which is a plurality of elements symmetrical to the plurality of communication flow passages BR1, are formed correspondingly for the nozzle row Ln2. The supply flow passage BA1 and the supply flow passage BA2 will sometimes be hereinafter collectively referred to as "supply flow passage BA". The connection flow passages BK1 and the connection flow passages BK2 will sometimes be hereinafter collectively referred to as "connection flow passages BK". The communication flow passages BR1 and the communication flow passages BR2 will sometimes be hereinafter collectively referred to as "communication flow passages BR".

As illustrated in FIGS. 2 and 3, the pressure compartment substrate 23 is provided at a Z2-side position as viewed from the communication plate 22. The pressure compartment substrate 23 is a plate-like member that has longer sides in the Y-axis direction and extends substantially in parallel with the X-Y plane. In the first embodiment, the pressure compartment substrate 23 is assumed to be manufactured by, for example, processing a monocrystalline silicon substrate by using a semiconductor manufacturing technology. Any known material and method, however, may be used for manufacturing the pressure compartment substrate 23.

Passages through which ink flows are formed in the pressure compartment substrate 23. Specifically, in the pressure compartment substrate 23, a plurality of pressure compartments CV1 corresponding to the plurality of nozzles N1, a plurality of communication flow passages BC1 (not illustrated in FIG. 2) corresponding to the plurality of nozzles N1, and a plurality of communication flow passages BD1 (not illustrated in FIG. 2) corresponding to the plurality of nozzles N1, are formed correspondingly for the nozzle row Ln1. As illustrated in FIG. 3, the communication flow passages BC1 are in communication with the connection flow passages BK1 and are provided in such a way as to extend in the X-axis direction at Z2-side positions as viewed from the connection flow passages BK1. The communication flow passages BD1 are in communication with the communication flow passages BC1 and are provided in such a way as to extend in the X-axis direction at X2-side positions as viewed from the communication flow passages BC1. The pressure compartments CV1 are provided in such a way as to connect the X2-side end portion of the communication flow passages BD1 to the X1-side end portion of the communication flow passages BR1 and in such a way as to extend in the X-axis direction.

In the pressure compartment substrate 23, a plurality of pressure compartments CV2, which is a plurality of elements symmetrical to the plurality of pressure compartments CV1, a plurality of communication flow passages BC2, which is a plurality of elements symmetrical to the plurality of communication flow passages BC1, and a plurality of communication flow passages BD2, which is a plurality of elements symmetrical to the plurality of communication flow passages BD1, are formed correspondingly for the nozzle row Ln2. The pressure compartments CV1 and the pressure compartments CV2 will sometimes be hereinafter collectively referred to as "pressure compartments CV". The communication flow passages BC1 and the communication flow passages BC2 will sometimes be hereinafter collectively referred to as "communication flow passages BC". The communication flow passages BD1 and the communication flow passages BD2 will sometimes be hereinafter collectively referred to as "communication flow passages BD".

As illustrated in FIGS. 2 and 3, the diaphragm 24 is provided at a Z2-side position as viewed from the pressure compartment substrate 23. The diaphragm 24 is a plate-like member that has longer sides in the Y-axis direction, extends substantially in parallel with the X-Y plane, and is able to vibrate elastically.

As illustrated in FIGS. 2 and 3, a plurality of piezoelectric elements PZ1 corresponding to the plurality of pressure compartments CV1 is provided each at a Z2-side position as viewed from the diaphragm 24 correspondingly for the nozzle row Ln1. The piezoelectric element PZ1 is a drive element that deforms in response to a change in potential of the drive signal Com. In other words, the piezoelectric element PZ1 is an example of an energy conversion element that converts the electric energy of the drive signal Com into motion energy. Specifically, the piezoelectric element PZ1 is driven to deform in response to a change in potential of the drive signal Com. The diaphragm 24 vibrates by being driven by the deformation of the piezoelectric element PZ1, and causes a change in pressure inside the pressure compartment CV1 by means of this vibration. Due to the change in pressure inside the pressure compartment CV1, ink with which the inside of the pressure compartment CV1 is filled is ejected from the nozzle N1 after flowing through the communication flow passage BR1.

A plurality of piezoelectric elements PZ2, which is a plurality of elements symmetrical to the plurality of piezoelectric elements PZ1, is provided each at a Z2-side position as viewed from the diaphragm 24 correspondingly for the nozzle row Ln2. The piezoelectric elements PZ1 and the piezoelectric elements PZ2 will sometimes be hereinafter collectively referred to as "piezoelectric elements PZ".

As illustrated in FIGS. 2 and 3, the sealing substrate 25 for protecting the plurality of piezoelectric elements PZ is provided at a Z2-side position as viewed from the diaphragm 24. The sealing substrate 25 is a plate-like member that has longer sides in the Y-axis direction and extends substantially in parallel with the X-Y plane. In the first embodiment, the sealing substrate 25 is assumed to be manufactured by, for example, processing a monocrystalline silicon substrate by using a semiconductor manufacturing technology. Any known material and method, however, may be used for manufacturing the sealing substrate 25.

The sealing substrate 25 has two surfaces whose normal-line direction is the Z-axis direction, and, as illustrated in FIGS. 2 and 3, a recess OB1 that defines a sealing space SP1 for housing the plurality of piezoelectric elements PZ1 is provided in the Z1-side one of these two surfaces correspondingly for the nozzle row Ln1. The sealing space SP1 is a space for the sealed enclosure of the piezoelectric elements PZ1, thus preventing the properties of the piezoelectric elements PZ1 from changing due to the influence of moisture or the like. In the description below, when the sealing substrate 25 is viewed in plan in the Z1 direction, the one, of two walls that the recess OB1 includes in the X-axis direction, located on the X2-directional side will be referred to as "wall WA1", and the one located on the X1-directional side will be referred to as "wall WB1".

A recess OB2 that includes a wall WA2 and a wall WB2 and defines a sealing space SP2 is provided in the sealing substrate 25 correspondingly for the nozzle row Ln2. The wall WA2 is an element symmetrical to the wall WA1. The wall WB2 is an element symmetrical to the wall WB1. The sealing space SP2 is an element symmetrical to the sealing space SP1. The sealing space SP1 and the sealing space SP2 will sometimes be hereinafter collectively referred to as "sealing space SP". The recess OB1 and the recess OB2 will sometimes be hereinafter collectively referred to as "recess OB". The wall WA1 and the wall WA2 will sometimes be hereinafter collectively referred to as "wall WA". The wall WB1 and the wall WB2 will sometimes be hereinafter collectively referred to as "wall WB".

A through hole 250 is provided in the sealing substrate 25. The through hole 250 is a through-hole cavity that is located between the sealing space SP1 and the sealing space SP2 when the sealing substrate 25 is viewed in the Z1 direction and goes from the Z1-side surface of the sealing substrate 25 to the Z2-side surface of the sealing substrate 25. A wiring substrate 4 is inserted in the through hole 250.

As illustrated in FIGS. 2 and 3, the flow passage forming substrate 26 is provided at a Z2-side position as viewed from the communication plate 22. The flow passage forming substrate 26 is a plate-like member that has longer sides in the Y-axis direction and extends substantially in parallel with the X-Y plane. In the first embodiment, the flow passage forming substrate 26 is assumed to be manufactured by performing injection molding of a resin material. Any known material and method, however, may be used for manufacturing the flow passage forming substrate 26.

Passages through which ink flows are formed in the flow passage forming substrate 26. Specifically, in the flow passage forming substrate 26, one supply flow passage BB1 and one inlet HL1 are provided correspondingly for the nozzle row Ln1. The supply flow passage BB1 is in communication with the supply flow passage BA1 and is provided in such a way as to extend in the Y-axis direction at a Z2-side position as viewed from the supply flow passage BA1. The inlet HL1 is in communication with the supply flow passage BB1. Ink is supplied from the liquid container 93 into the supply flow passage BB1 through the inlet HL1. The ink having been supplied from the liquid container 93 into the supply flow passage BB1 through the inlet HL1 flows into the supply flow passage BA1. A part of the ink having flowed into the supply flow passage BA1 flows through the connection flow passage BK1, and the pressure compartment CV1 becomes filled with this part of the ink. When the piezoelectric element PZ1 is driven by means of the drive signal Com, the part of the ink having filled the pressure compartment CV1 flows through the communication flow passage BR1 and is then ejected from the nozzle N1.

In the flow passage forming substrate 26, a supply flow passage BB2, which is an element symmetrical to the supply flow passage BB1, and an inlet HL2, which is an element symmetrical to the inlet HL1, are provided correspondingly for the nozzle row Ln2. The supply flow passage BB1 and the supply flow passage BB2 will sometimes be hereinafter collectively referred to as "supply flow passage BB". The inlet HL1 and the inlet HL2 will sometimes be hereinafter collectively referred to as "inlet HL".

A through hole 260 is provided in the flow passage forming substrate 26. The through hole 260 is a through-hole cavity that is located between the supply flow passage BB1 and the supply flow passage BB2 when the flow passage forming substrate 26 is viewed in the Z1 direction and goes from the Z1-side surface of the flow passage forming substrate 26 to the Z2-side surface of the flow passage forming substrate 26. The wiring substrate 4 is inserted in the through hole 260.

As illustrated in FIGS. 2 and 3, the wiring substrate 4 is mounted on the Z2-side surface of the actuator substrate AT, which includes the diaphragm 24 and the piezoelectric structural body 27. The wiring substrate 4 is a component for electrically coupling the liquid ejecting head 1 to the control device 8. For example, a flexible wiring board such as FPC or FFC can be preferably used as the wiring substrate 4. FPC is an acronym for Flexible Printed Circuit. FFC is an acronym for Flexible Flat Cable. An integrated circuit 40 is mounted on the wiring substrate 4. The integrated circuit 40 is an electric circuit that performs switching as to whether or not to supply the drive signal Com to the piezoelectric element PZ under the control using the control signal SI.

As illustrated in FIGS. 2 and 3, the compliance sheet CS1 is provided at a Z1-side position as viewed from the communication plate 22 correspondingly for the nozzle row Ln1 in such a way as to close the supply flow passage BA1 and the connection flow passages BK1. The compliance sheet CS1 is a plate-like member that has longer sides in the Y-axis direction and extends substantially in parallel with the X-Y plane. The compliance sheet CS1 is made of an elastic material, and absorbs the pressure fluctuations of ink inside the supply flow passage BA1 and the connection flow passages BK1.

In the liquid ejecting head 1, the compliance sheet CS2, which is an element symmetrical to the compliance sheet CS1, is provided correspondingly for the nozzle row Ln2. The compliance sheet CS1 and the compliance sheet CS2 will sometimes be hereinafter collectively referred to as "compliance sheet CS".

A.3. Structure of Liquid Ejecting Head

With reference to FIGS. 4 to 7, the structure of the liquid ejecting head 1 will now be explained.

Figure 4:
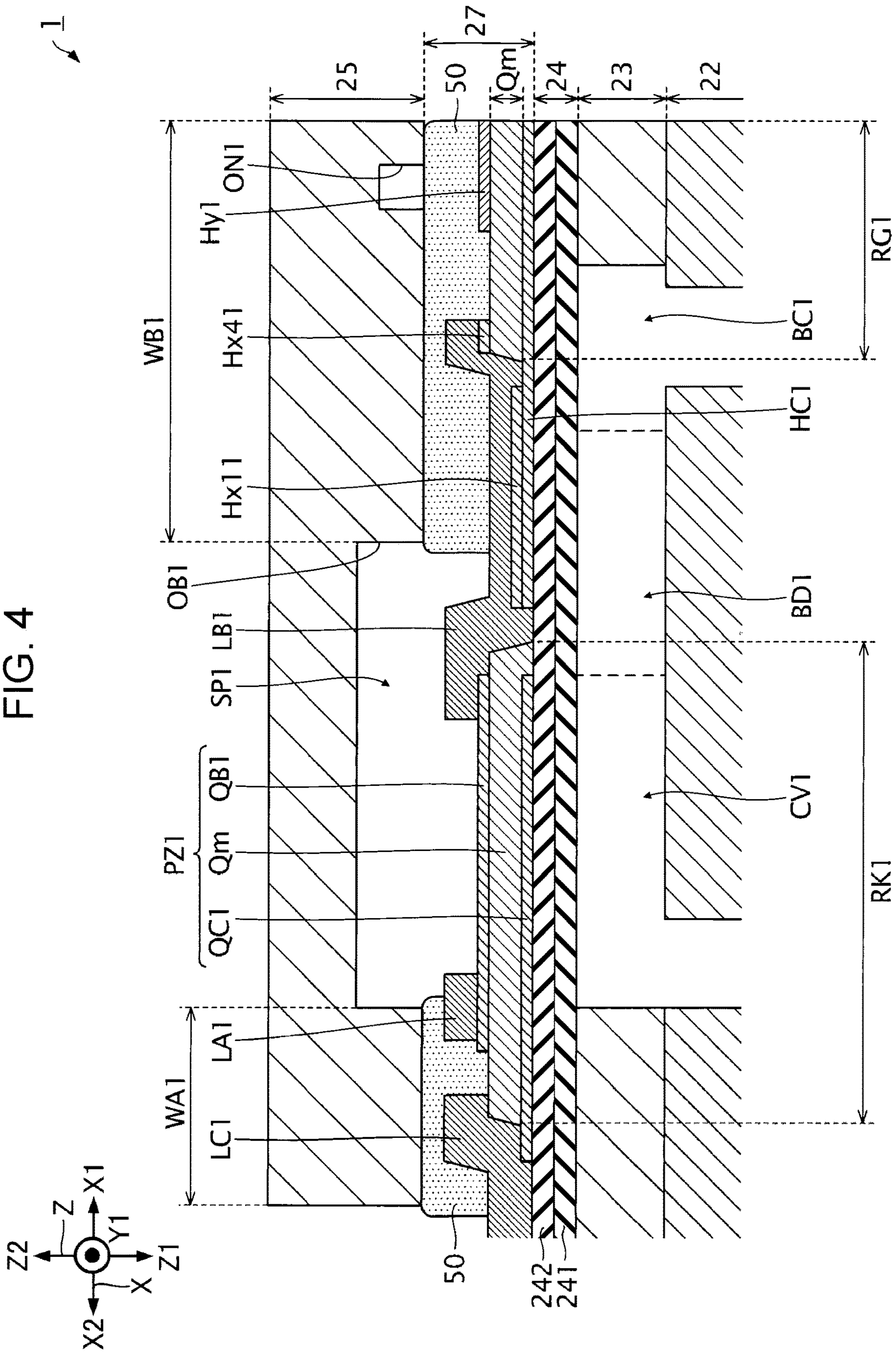
FIG. 4 is a close-sectional view of an example of the configuration of the liquid ejecting head.
Figure 5:
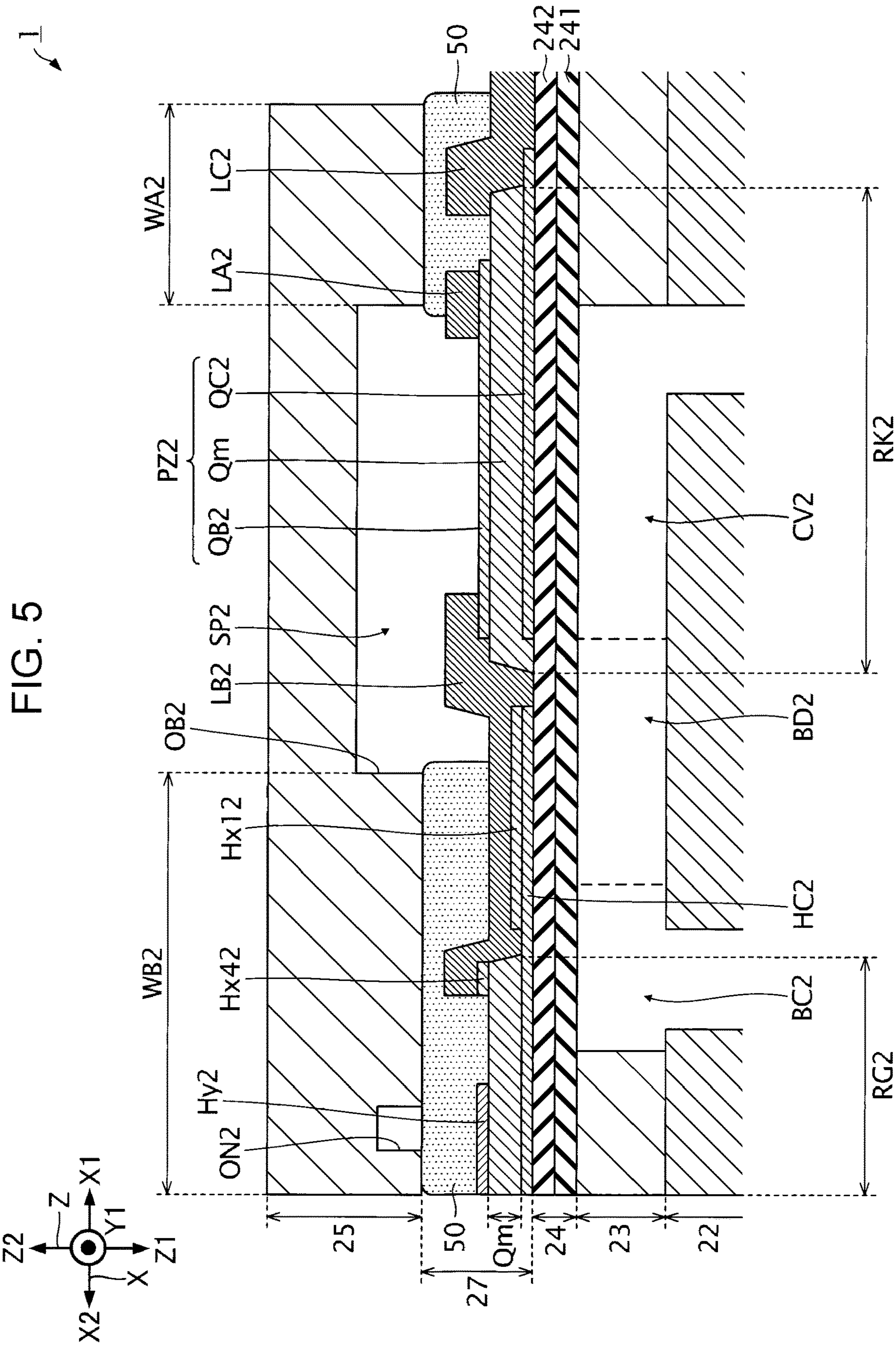
FIG. 5 is a close-sectional view of an example of the configuration of the liquid ejecting head.

FIG. 4 is a cross-sectional view of the liquid ejecting head 1, wherein the neighborhood of the piezoelectric element PZ1 of the liquid ejecting head 1 is viewed in a cross-sectional manner in the Y2 direction. FIG. 5 is a cross-sectional view of the liquid ejecting head 1, wherein the neighborhood of the piezoelectric element PZ2 of the liquid ejecting head 1 is viewed in a cross-sectional manner in the Y2 direction. Note that the illustration in FIGS. 4 and 5 is not to scale in the X-axis direction, and an actual scaling factor may be, for example, a scaling factor corresponding to FIG. 3. For example, although it is illustrated in FIG. 4 as if the width of the pressure compartment CV1 in the X-axis direction were roughly the same as the sum of the width of the communication flow passage BC1 in the X-axis direction and the width of the communication flow passage BD1 in the X-axis direction, actually, the pressure compartment CV1 is larger as illustrated in FIG. 3.

As illustrated in FIGS. 4 and 5, the liquid ejecting head 1 includes the communication plate 22, the pressure compartment substrate 23, the diaphragm 24, the piezoelectric structural body 27, and the sealing substrate 25 as described above. As described above, the configuration that includes the diaphragm 24 and the piezoelectric structural body 27 is herein referred to as "actuator substrate AT", and the configuration that includes the actuator substrate AT, the pressure compartment substrate 23, and the sealing substrate 25 is herein referred to as "actuator chip AC".

As illustrated in FIGS. 4 and 5, the diaphragm 24 includes an elastic film layer 241 and an insulating layer 242 formed on the elastic film layer 241. The elastic film layer 241 is an elastic film formed of, for example, silicon oxide such as silicon dioxide ($SiO_2$). The insulating layer 242 is an insulating layer formed of, for example, zirconium oxide such as zirconium dioxide ($ZrO_2$). The piezoelectric structural body 27 is formed on the insulating layer 242.

As illustrated in FIG. 4, the piezoelectric structural body 27 includes the plurality of piezoelectric elements PZ1 corresponding to the plurality of nozzles N1, a plurality of individual wiring lines LC1 corresponding to the plurality of nozzles N1, a plurality of individual electrodes QC1 corresponding to the plurality of nozzles N1, a single piezoelectric body Qm common to the plurality of nozzles N1, a single common electrode QB1 common to the plurality of nozzles N1, a single auxiliary electrode LA1 common to the plurality of nozzles N1, a single auxiliary electrode LB1 common to the plurality of nozzles N1, a single auxiliary electrode HC1 common to the plurality of nozzles N1, a single auxiliary electrode Hx11 common to the plurality of nozzles N1, a single auxiliary electrode Hx41 common to the plurality of nozzles N1, and a single auxiliary layer Hy1 common to the plurality of nozzles N1 correspondingly for the nozzle row Ln1.

As described above, the liquid ejecting head 1 includes the plurality of piezoelectric elements PZ1 corresponding to the plurality of nozzles N1. The piezoelectric element PZ1 is a layered entity that includes the individual electrode QC1, the common electrode QB1, and the piezoelectric body Qm sandwiched therebetween. Specifically, the piezoelectric element PZ1 is a portion where the individual electrode QC1, the common electrode QB1, and the piezoelectric body Qm overlap with one another when the liquid ejecting head 1 is viewed in plan in the Z1 direction. In the first embodiment, the following mode is assumed as an example: in the piezoelectric element PZ1, the piezoelectric body Qm is provided at a Z2-side position as viewed from the individual electrode QC1, and the common electrode QB1 is provided at a Z2-side position as viewed from the piezoelectric body Qm. However, in the piezoelectric element PZ1, the piezoelectric body Qm may be provided at a Z1-side position as viewed from the individual electrode QC1, and the common electrode QB1 may be provided at a Z1-side position as viewed from the piezoelectric body Qm.

The individual electrode QC1 is formed of a conductive material such as platinum (Pt) or iridium (Ir). The individual electrode QC1 is layered on the diaphragm 24.

The piezoelectric body Qm is formed of a piezoelectric material such as lead zirconate titanate ($Pb(Zr,Ti)O_3$). In the description below, the portion, of the piezoelectric body Qm, constituting the plurality of piezoelectric elements PZ1 will be referred to as "piezoelectric body drive region RK1", and the portion thereof provided away from the piezoelectric body drive region RK1 at an X1-side position as viewed from the piezoelectric body drive region RK1 will be referred to as "piezoelectric body periphery region RG1". The piezoelectric body drive region RK1 is layered on the individual electrode QC1. The piezoelectric body drive region RK1 is provided at a position where at least a part of the piezoelectric body drive region RK1 overlaps with at least a part of the pressure compartment CV1, and, in addition, at least a part of the piezoelectric body drive region RK1 overlaps with at least a part of the wall WA1 when the liquid ejecting head 1 is viewed in plan in the Z1 direction. The piezoelectric body periphery region RG1 is layered on the auxiliary electrode HC1. The piezoelectric body periphery region RG1 is provided at a position where at least a part of the piezoelectric body periphery region RG1 overlaps with at least a part of the wall WB1 when the liquid ejecting head 1 is viewed in plan in the Z1 direction.

In the first embodiment, the following case is assumed as an example: the piezoelectric body Qm is provided such that the width of the piezoelectric body drive region RK1 in the X-axis direction is greater than the width of the piezoelectric body periphery region RG1 in the X-axis direction.

The common electrode QB1 is formed of a conductive material such as platinum (Pt) or iridium (Ir). The common electrode QB1 is layered on the piezoelectric body drive region RK1 of the piezoelectric body Qm.

The auxiliary electrode HC1 is formed of the same conductive material as that of the individual electrode QC1 and is layered on the insulating layer 242. The auxiliary electrode HC1 is electrically coupled to the common electrode QB1 and is disposed in a state of being insulated from the individual electrode QC1. The individual wiring line LC1 is formed of a conductive material such as gold (Au). The individual wiring line LC1 is layered on the insulating layer 242, the individual electrode QC1, and the piezoelectric body drive region RK1. The individual wiring line LC1 is electrically coupled to the individual electrode QC1 and supplies, to the individual electrode QC1, the drive signal Com supplied from the control device 8. In the first embodiment, it is assumed that the individual wiring line LC1 is electrically coupled to the individual electrode QC1 by layering the individual wiring line LC1 directly on the individual electrode QC1; however, the scope of the present disclosure is not limited to this mode. The individual wiring line LC1 may be electrically coupled to the individual electrode QC1 via a conductor provided in a contact hole provided in the piezoelectric body drive region RK1 of the piezoelectric body Qm. The auxiliary electrode LA1 is formed of a conductive material such as gold (Au). The auxiliary electrode LA1 is layered on the common electrode QB1. The auxiliary electrode LA1 is electrically coupled to the common electrode QB1. The auxiliary electrode Hx11 is formed of the same conductive material as that of the common electrode QB1 and is layered on the auxiliary electrode HC1. The auxiliary electrode Hx11 is electrically coupled to the common electrode QB1 and is disposed in a state of being insulated from the individual electrode QC1. The auxiliary electrode Hx41 is formed of the same conductive material as that of the common electrode QB1 and is layered on the piezoelectric body periphery region RG1. The auxiliary electrode Hx41 is electrically coupled to the common electrode QB1 and is disposed in a state of being insulated from the individual electrode QC1. The auxiliary electrode LB1 is formed of a conductive material such as gold (Au). The auxiliary electrode LB1 is layered on the common electrode QB1, the auxiliary electrode HC1, the auxiliary electrode Hx11, and the auxiliary electrode Hx41 and electrically couples the common electrode QB1, the auxiliary electrode HC1, the auxiliary electrode Hx11, and the auxiliary electrode Hx41.

The auxiliary layer Hy1 is formed of a conductive material such as nichrome (NiCr). However, the auxiliary layer Hy1 may be formed of a non-conductive material. The auxiliary layer Hy1 is layered on the piezoelectric body periphery region RG1. The auxiliary layer Hy1 is disposed in a state of being insulated from the individual electrode QC1 and the common electrode QB1.

As illustrated in FIG. 4, the piezoelectric structural body 27 includes an adhesive layer 50. The adhesive layer 50 is made of an adhesive. The adhesive layer 50 bonds the individual wiring line LC1, the piezoelectric body drive region RK1, and the auxiliary electrode LA1 to the wall WA1 of the sealing substrate 25. In addition, the adhesive layer 50 bonds the auxiliary electrode LB1, the piezoelectric body periphery region RG1, and the auxiliary layer Hy1 to the wall WB1 of the sealing substrate 25.

As illustrated in FIG. 5, the piezoelectric structural body 27 includes the plurality of piezoelectric elements PZ2, which is a plurality of elements symmetrical to the plurality of piezoelectric elements PZ1, a plurality of individual wiring lines LC2, which is a plurality of elements symmetrical to the plurality of individual wiring lines LC1, a plurality of individual electrodes QC2, which is a plurality of elements symmetrical to the plurality of individual electrodes QC1, a single piezoelectric body Qm, a single common electrode QB2, which is an element symmetrical to the single common electrode QB1, a single auxiliary electrode LA2, which is an element symmetrical to the single auxiliary electrode LA1, a single auxiliary electrode LB2, which is an element symmetrical to the single auxiliary electrode LB1, a single auxiliary electrode HC2, which is an element symmetrical to the single auxiliary electrode HC1, a single auxiliary electrode Hx12, which is an element symmetrical to the single auxiliary electrode Hx11, a single auxiliary electrode Hx42, which is an element symmetrical to the single auxiliary electrode Hx41, and a single auxiliary layer Hy2, which is an element symmetrical to the single auxiliary layer Hy1, correspondingly for the nozzle row Ln2. The piezoelectric body Qm includes a piezoelectric body drive region RK2, which is an element symmetrical to the piezoelectric body drive region RK1, and a piezoelectric body periphery region RG2, which is an element symmetrical to the piezoelectric body periphery region RG1, correspondingly for the nozzle row Ln2. The individual wiring line LC1 and the individual wiring line LC2 will sometimes be hereinafter collectively referred to as "individual wiring line LC". The individual electrode QC1 and the individual electrode QC2 will sometimes be hereinafter collectively referred to as "individual electrode QC". The common electrode QB1 and the common electrode QB2 will sometimes be hereinafter collectively referred to as "common electrode QB". The auxiliary electrode LA1 and the auxiliary electrode LA2 will sometimes be hereinafter collectively referred to as "auxiliary electrode LA". The auxiliary electrode LB1 and the auxiliary electrode LB2 will sometimes be hereinafter collectively referred to as "auxiliary electrode LB". The auxiliary electrode HC1 and the auxiliary electrode HC2 will sometimes be hereinafter collectively referred to as "auxiliary electrode HC". The auxiliary electrode Hx11 and the auxiliary electrode Hx12 will sometimes be hereinafter collectively referred to as "auxiliary electrode Hx1". The auxiliary electrode Hx41 and the auxiliary electrode Hx42 will sometimes be hereinafter collectively referred to as "auxiliary electrode Hx4". The auxiliary layer Hy1 and the auxiliary layer Hy2 will sometimes be hereinafter collectively referred to as "auxiliary layer Hy". The piezoelectric body drive region RK1 and the piezoelectric body drive region RK2 will sometimes be hereinafter collectively referred to as "piezoelectric body drive region RK". The piezoelectric body periphery region RG1 and the piezoelectric body periphery region RG2 will sometimes be hereinafter collectively referred to as "piezoelectric body periphery region RG".

As illustrated in FIG. 4, the recess OB1 that defines the sealing space SP1 for housing the plurality of piezoelectric elements PZ1 is provided in the sealing substrate 25 correspondingly for the nozzle row Ln1 as described above. In addition, a groove ON1 for accommodating an overflowing part of the adhesive included in the adhesive layer 50 is provided in the wall WB1 of the sealing substrate 25 correspondingly for the nozzle row Ln1.

As illustrated in FIG. 5, the recess OB2, which is an element symmetrical to the recess OB1, and a groove ON2, which is an element symmetrical to the groove ON1, are provided in the sealing substrate 25 correspondingly for the nozzle row Ln2 as described above. The groove ON1 and the groove ON2 will sometimes be hereinafter collectively referred to as "groove ON".

Figure 6:
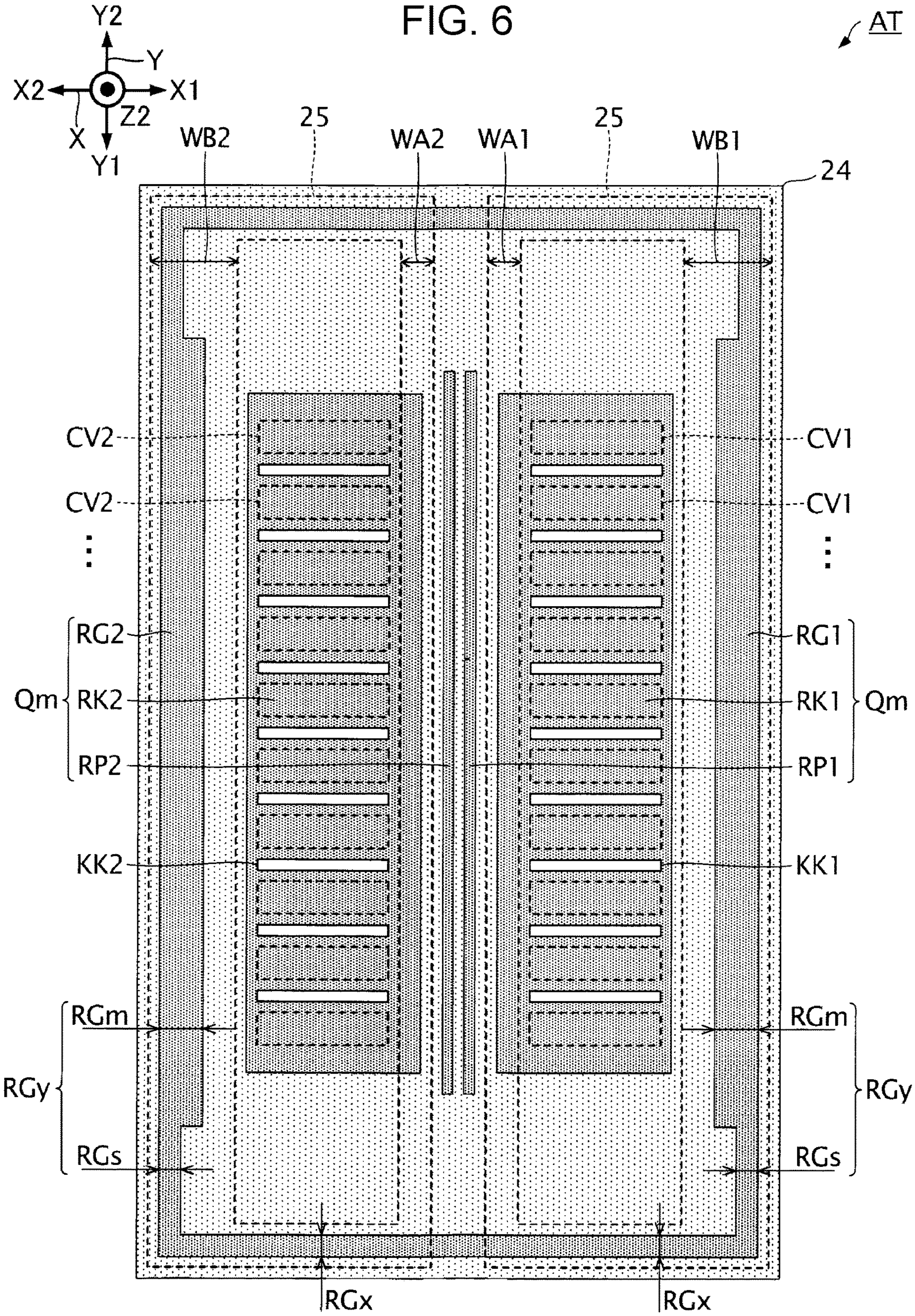
FIG. 6 is a plan view of an example of the configuration of an actuator substrate.

FIG. 6 is a plan view of the actuator substrate AT when the actuator substrate AT provided in the liquid ejecting head 1 is viewed in plan in the Z1 direction. Note that, in FIG. 6, besides the actuator substrate AT, which includes the diaphragm 24 and the piezoelectric body Qm, the sealing substrate 25, which is provided at a Z2-side position (over) as viewed from the actuator substrate AT, and the plurality of pressure compartments CV, which is provided at a Z1-side position (under) as viewed from the actuator substrate AT, are illustrated using broken lines.

As described above, the actuator substrate AT includes the diaphragm 24 and the piezoelectric body Qm, which is layered over the diaphragm 24.

As illustrated in FIG. 6, the piezoelectric body Qm includes the piezoelectric body drive region RK1 extending in the Y-axis direction correspondingly for the nozzle row Ln1 as described above. The piezoelectric body drive region RK1 is provided in such a way as to overlap with the plurality of pressure compartments CV1 and overlap with at least a part of the wall WA1 when the liquid ejecting head 1 is viewed in plan. A plurality of openings KK1 is provided in the piezoelectric body drive region RK1. The openings KK1 are through holes going through the piezoelectric body drive region RK1 in the Z-axis direction. In the piezoelectric body drive region RK1, each of the openings KK1 is provided between two pressure compartments CV1 located adjacent to each other among the plurality of pressure compartments CV1 when the liquid ejecting head 1 is viewed in plan. Since the piezoelectric body drive region RK1 has the opening KK1, when the piezoelectric element PZ1 corresponding to the pressure compartment CV1 that is one of two pressure compartments CV1 located adjacent to each other is driven by means of the drive signal Com, it is possible to suppress the transmission of vibrations caused by this driving to the piezoelectric element PZ1 corresponding to the pressure compartment CV1 that is the other of the two pressure compartments CV1 located adjacent to each other. It has been found that the piezoelectric body Qm is susceptible to damage at the boundary between the piezoelectric body drive region RK1, which is the active portion of the piezoelectric body Qm, and the inactive portion of the piezoelectric body Qm located adjacent to the active portion in the X2 direction as the use progresses. Since the portion where the piezoelectric body Qm moves and the portion where the piezoelectric body Qm does not move are located adjacent to each other when driven, the difference in distortion of the piezoelectric body Qm therebetween is prone to be significant, which is the likely cause of the damage. To suppress this, in the present embodiment, the boundary is provided at a position where it overlaps with the wall WA1 when the liquid ejecting head 1 is viewed in plan, and the boundary is pressed by the wall WA1. Since this makes it harder for the portion overlapping with the wall WA1, even though located in the piezoelectric body drive region RK1, to move; therefore, it is possible to reduce the above-described damage. In order to form this structure, as described above, a part of the piezoelectric body drive region RK1 is disposed in such a way as to overlap with the wall WA1 when viewed in plan. If the piezoelectric body Qm is provided away from the piezoelectric body drive region RK1 also at a position of overlapping with the wall WA1 in a plan view similarly to a position of overlapping with the wall WB1 in a plan view, which will be described later, an effect of reducing entering of a foreign substance and an effect of suppressing a decrease in sealing performance and ejecting performance due to vibration transmission can be obtained. However, the side at the wall WA1 is more susceptible to the above-described damage at the boundary between the active portion and the inactive portion as the use progresses than the side at the wall WB1. The reasons can be inferred as follows. Since the side at the wall WA1 lies close to the nozzle N1, there is a risk that the occurrence of the damage might make the ejection itself impossible; moreover, since the drive signal Com is applied to the individual electrode QC1 from the side at the wall WA1, it is harder for a voltage to drop at the wall WA1 than at the wall WB1, resulting in large voltage application. Therefore, in the present embodiment, a greater importance is placed on reducing the damage due to the use at the side at the wall WA1, and a part of the piezoelectric body drive region RK1 is thus disposed to overlap with the wall WA1 in a plan view.

The piezoelectric body Qm includes the piezoelectric body drive region RK2, which is an element symmetrical to the piezoelectric body drive region RK1, correspondingly for the nozzle row Ln2 as described above. A plurality of openings KK2, which is a plurality of elements symmetrical to the plurality of openings KK1, is provided in the piezoelectric body drive region RK2.

As illustrated in FIG. 6, the piezoelectric body Qm includes the piezoelectric body periphery region RG1 correspondingly for the nozzle row Ln1. The piezoelectric body periphery region RG1 overlaps with at least a part of the wall WB1 when the liquid ejecting head 1 is viewed in plan, and is provided away from the piezoelectric body drive region RK1.

The piezoelectric body periphery region RG1 includes an extending portion RGy, which extends in the Y-axis direction at an X1-side position as viewed from the piezoelectric body drive region RK1, and two extending portions RGx, which extend in the X-axis direction at a Y1-side position and at a Y2-side position respectively as viewed from the piezoelectric body drive region RK1. The extending portion RGy includes a middle portion RGm, which overlaps with the plurality of pressure compartments CV1 when the liquid ejecting head 1 is viewed in the X-axis direction, and a both-end portion RGs, which does not overlap with the plurality of pressure compartments CV1 when the liquid ejecting head 1 is viewed in the X-axis direction. In the first embodiment, the following case is assumed as an example: the piezoelectric body periphery region RG1 is provided such that the width of the middle portion RGm in the X-axis direction is greater than the width of the both-end portion RGs in the X-axis direction. Moreover, in the first embodiment, the following case is assumed as an example: the piezoelectric body periphery region RG1 is provided such that the width of the middle portion RGm in the X-axis direction is greater than the width of the extending portion RGx in the Y-axis direction.

The piezoelectric body Qm includes the piezoelectric body periphery region RG2, which is an element symmetrical to the piezoelectric body periphery region RG1, correspondingly for the nozzle row Ln2 as described above. The piezoelectric body periphery region RG2 includes the extending portion RGy and the extending portions RGx.

As illustrated in FIG. 6, the piezoelectric body Qm includes a piezoelectric body center region RP1 extending in the Y-axis direction correspondingly for the nozzle row Ln1. The piezoelectric body center region RP1 is provided in such a way as to overlap with the wiring substrate 4 when the liquid ejecting head 1 is viewed in plan. Conductive wiring lines (not illustrated) to which wiring lines provided on the wiring substrate 4 and the individual wiring lines LC are electrically coupled are provided on the piezoelectric body center region RP1.

The piezoelectric body Qm includes a piezoelectric body center region RP2, which is an element symmetrical to the piezoelectric body center region RP1, correspondingly for the nozzle row Ln2 as described above. The piezoelectric body center region RP1 and the piezoelectric body center region RP2 will sometimes be hereinafter collectively referred to as "piezoelectric body center region RP".

Figure 7:
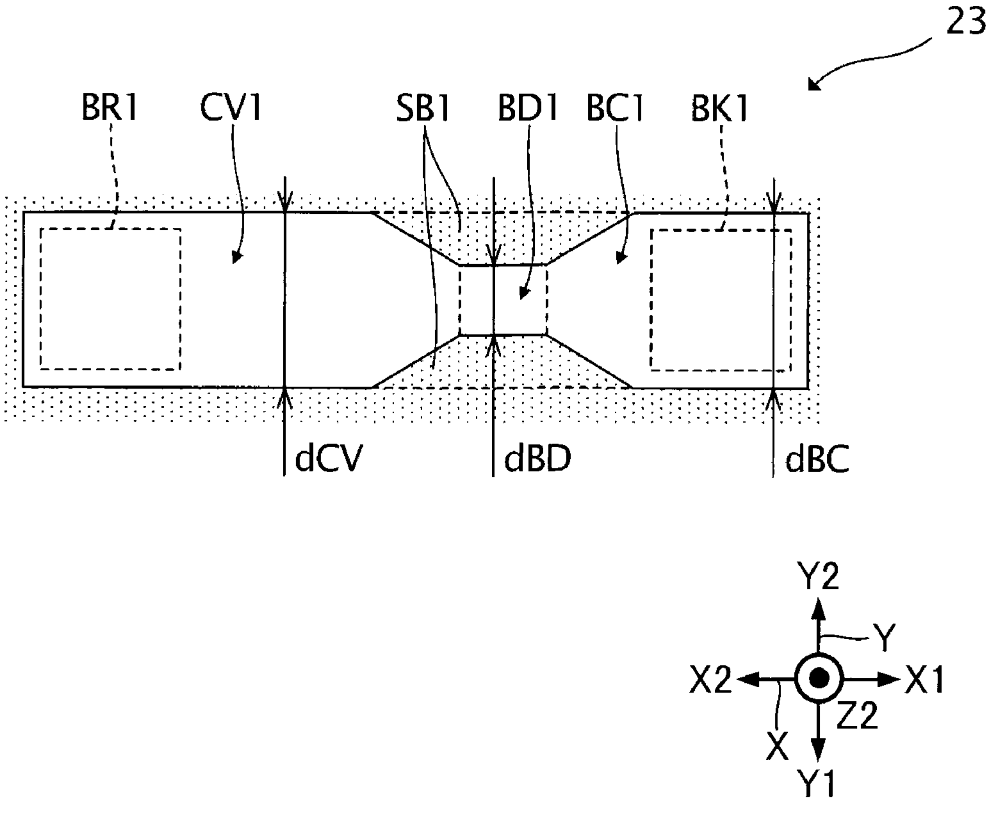
FIG. 7 is a plan view of an example of the configuration of a pressure compartment substrate.

FIG. 7 is a plan view of the pressure compartment substrate 23 when the neighborhood of the pressure compartment CV1 of the pressure compartment substrate 23 provided in the liquid ejecting head 1 is viewed in plan in the Z1 direction.

As illustrated in FIG. 7, the pressure compartment(s) CV1, the communication flow passage(s) BC1, and the communication flow passage(s) BD1 are formed in the pressure compartment substrate 23 correspondingly for the nozzle row Ln1. The pressure compartment CV1 extends in the X-axis direction and is in communication with the communication flow passage BR1. The communication flow passage BC1 extends in the X-axis direction and is in communication with the connection flow passage BK1. The communication flow passage BD1 extends in the X-axis direction and provides communication between the pressure compartment CV1 and the communication flow passage BC1. In the first embodiment, the cross-sectional area of the communication flow passage BD1 is smaller than the cross-sectional area of the pressure compartment CV1 and is smaller than the cross-sectional area of the communication flow passage BC1. For example, when the pressure compartment substrate 23 is viewed in plan in the Z-axis direction, the width dBD of the communication flow passage BD1 in the Y-axis direction is less than the width dBC of the communication flow passage BC1 in the Y-axis direction and is less than the width dCV of the pressure compartment CV1 in the Y-axis direction. The portion, of the pressure compartment substrate 23, defining the wall surface of the communication flow passage BD1 is herein referred to as "narrowed portion SB1".

In the pressure compartment substrate 23, as described above, the pressure compartments CV2, which are elements symmetrical to the pressure compartments CV1, the communication flow passages BC2, which are elements symmetrical to the communication flow passages BC1, and the communication flow passages BD2, which are elements symmetrical to the communication flow passages BD1, are formed correspondingly for the nozzle row Ln2.

A.4. Reference Examples

For the purpose of making the features of the liquid ejecting head 1 according to the first embodiment clear, a liquid ejecting head 1Z according to a first reference example and a liquid ejecting head 1W according to a second reference example will now be described.

Figure 8:
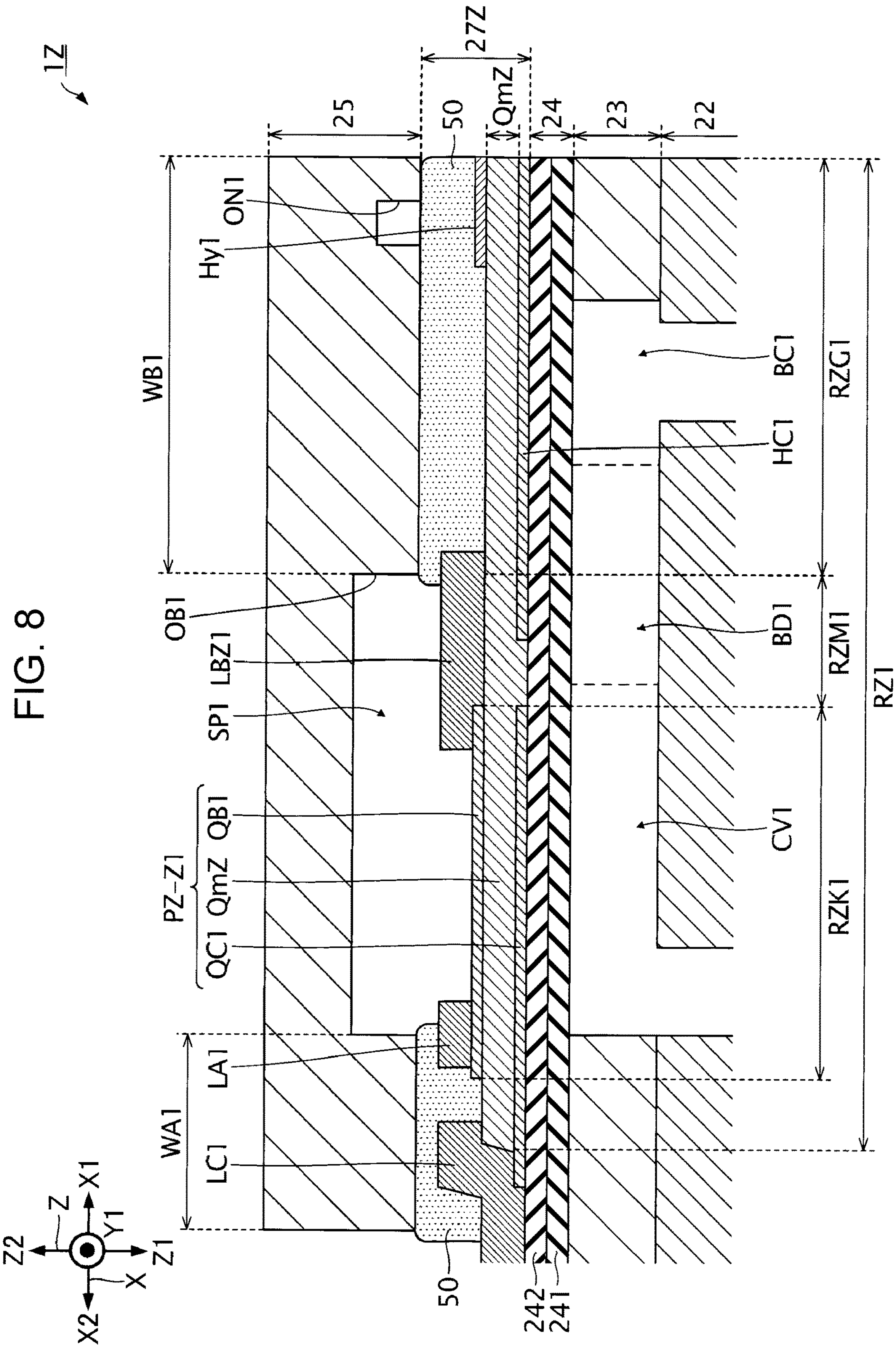
FIG. 8 is a close-sectional view of an example of the configuration of a liquid ejecting head according to a first reference example.
Figure 9:
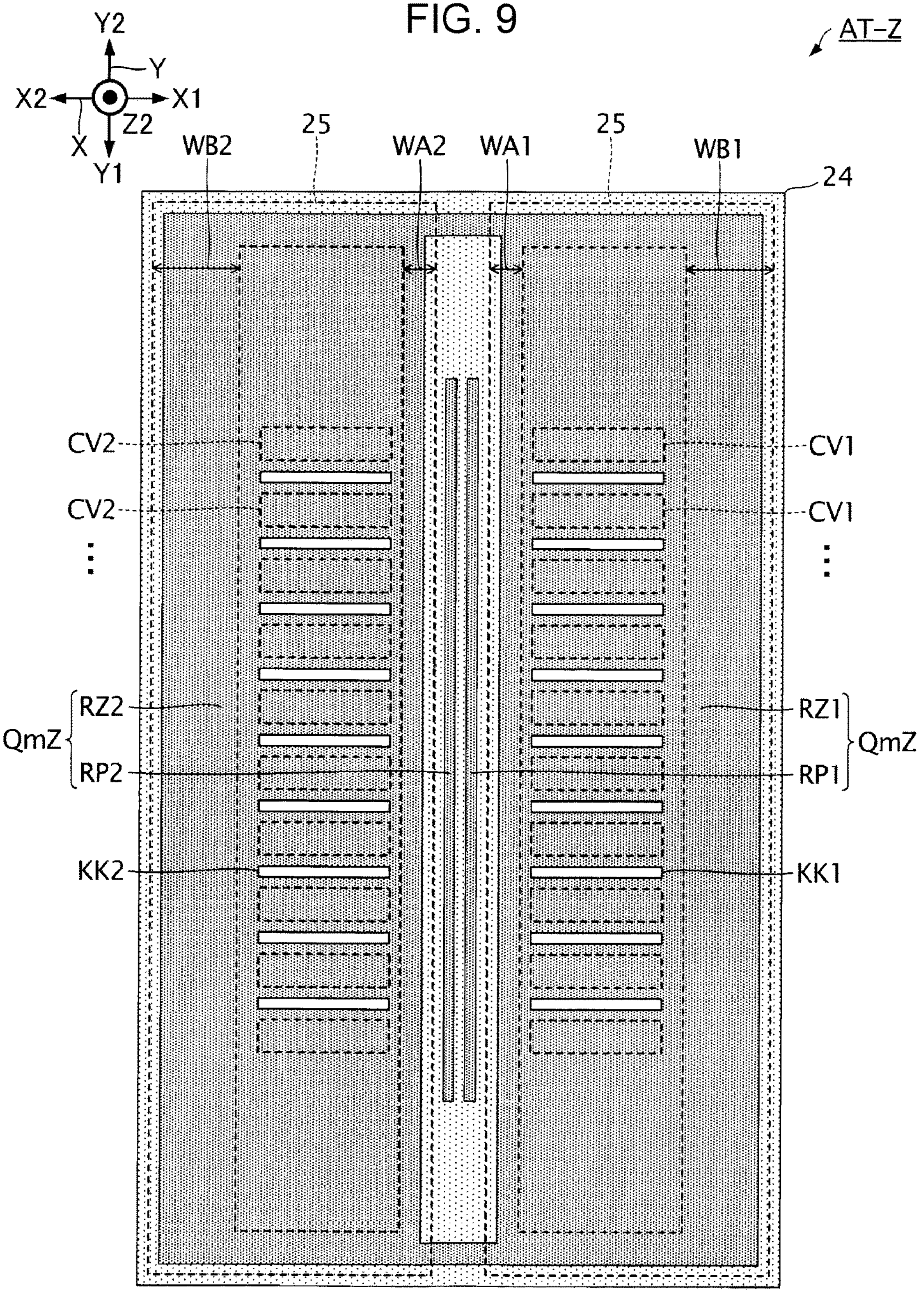
FIG. 9 is a plan view of an example of the configuration of an actuator substrate according to the first reference example.

FIG. 8 is a cross-sectional view of the liquid ejecting head 1Z according to the first reference example, wherein the liquid ejecting head 1Z is viewed in a cross-sectional manner in the Y2 direction. FIG. 9 is a plan view of an actuator substrate AT-Z when the actuator substrate AT-Z provided in the liquid ejecting head 1Z is viewed in plan in the Z1 direction.

As illustrated in FIGS. 8 and 9, the liquid ejecting head 1Z is different from the liquid ejecting head 1 according to the first embodiment in that it includes a piezoelectric structural body 27Z including a piezoelectric body QmZ in place of the piezoelectric structural body 27 including the piezoelectric body Qm. The piezoelectric body QmZ is different from the piezoelectric body Qm according to the first embodiment in that it includes a piezoelectric body extending region RZ1 in place of the piezoelectric body drive region RK1 and the piezoelectric body periphery region RG1 correspondingly for the nozzle row Ln1.

As illustrated in FIGS. 8 and 9, the piezoelectric body extending region RZ1 is provided in a range in which at least a part of the piezoelectric body extending region RZ1 overlaps with the pressure compartments CV1, at least a part of the piezoelectric body extending region RZ1 overlaps with at least a part of the wall WA1, and, in addition, at least a part of the piezoelectric body extending region RZ1 overlaps with at least a part of the wall WB1 when the liquid ejecting head 1Z is viewed in plan in the Z1 direction. That is, as in related art, the piezoelectric body extending region RZ1 of the piezoelectric body QmZ is a region obtained by widening the extending range of the piezoelectric body Qm in such a way as to integrate the piezoelectric body drive region RK1 and the piezoelectric body periphery region RG1 into one continuous region by widening the extending range of the piezoelectric body drive region RK1 of the piezoelectric body Qm and widening the extending range of the piezoelectric body periphery region RG1 thereof.

The liquid ejecting head 1Z is different from the liquid ejecting head 1 according to the first embodiment in that it includes a piezoelectric element PZ-Z1 in place of the piezoelectric element PZ1. The piezoelectric element PZ-Z1 is different from the piezoelectric element PZ1 according to the first embodiment in that it includes the piezoelectric body QmZ in place of the piezoelectric body Qm. The piezoelectric structural body 27Z is different from the piezoelectric structural body 27 according to the first embodiment in that it includes an auxiliary electrode LBZ1 layered on the piezoelectric body QmZ in place of the auxiliary electrode LB1. The piezoelectric structural body 27Z is different from the piezoelectric structural body 27 according to the first embodiment in that it does not include the auxiliary electrode Hx11 and the auxiliary electrode Hx41.

In the description below, as illustrated in FIG. 8, the part, of the piezoelectric body extending region RZ1 of the piezoelectric body QmZ, constituting the piezoelectric element PZ-Z1 will be referred to as "piezoelectric body drive region RZK1". In the description below, the part, of the piezoelectric body extending region RZ1, located under the wall WB1 and supporting the wall WB1 will be referred to as "piezoelectric body periphery region RZG1". In the description below, the part, of the piezoelectric body extending region RZ1, located between the piezoelectric body drive region RZK1 and the piezoelectric body periphery region RZG1 will be referred to as "piezoelectric body connection region RZM1".

It is assumed that the liquid ejecting head 1Z has a substantially plane-symmetric structure with respect to a plane whose normal-line direction is the X-axis direction. Specifically, the liquid ejecting head 1Z includes a piezoelectric body extending region RZ2, which is an element symmetrical to the piezoelectric body extending region RZ1, a piezoelectric element PZ-Z2, which is an element symmetrical to the piezoelectric element PZ-Z1, and an auxiliary electrode LBZ2, which is an element symmetrical to the auxiliary electrode LBZ1, correspondingly for the nozzle row Ln2. In the description below, the piezoelectric body extending region RZ1 and the piezoelectric body extending region RZ2 will sometimes be collectively referred to as "piezoelectric body extending region RZ", the piezoelectric element PZ-Z1 and the piezoelectric element PZ-Z2 will sometimes be collectively referred to as "piezoelectric element PZ-Z", and the auxiliary electrode LBZ1 and the auxiliary electrode LBZ2 will sometimes be collectively referred to as "auxiliary electrode LBZ".

As described above, in the liquid ejecting head 1Z according to the first reference example, the piezoelectric body extending region RZ1 of the piezoelectric body QmZ includes the piezoelectric body drive region RZK1 that is located over the pressure compartments CV1 and constitutes the piezoelectric element PZ-Z1, the piezoelectric body periphery region RZG1 that is located under the wall WB1, and the piezoelectric body connection region RZM1 that connects the piezoelectric body drive region RZK1 and the piezoelectric body periphery region RZG1, and the piezoelectric body extending region RZ1 extends widely from the portion under the wall WA1 to the portion under the wall WB1 in the X-axis direction. In the first reference example, since the piezoelectric body extending region RZ1 includes the piezoelectric body connection region RZM1 and has a wide area, for example, as compared with a mode that does not include the piezoelectric body connection region RZM1, there is a higher possibility of entering of a foreign substance between the actuator substrate AT-Z and the sealing substrate 25 in the process of bonding the actuator substrate AT-Z that includes the piezoelectric structural body 27Z including the piezoelectric body QmZ to the sealing substrate 25 by means of the adhesive layer 50. If a foreign substance enters between the actuator substrate AT-Z and the sealing substrate 25, when the piezoelectric element PZ-Z1 that includes the piezoelectric body QmZ included in the actuator substrate AT-Z is driven by means of the drive signal Com, there is a possibility that the piezoelectric element PZ-Z1 might be driven in a manner different from a manner defined by the drive signal Com due to the influence of the foreign substance. That is, if a foreign substance enters between the actuator substrate AT-Z and the sealing substrate 25, there is a possibility that the performance of ejecting ink from the liquid ejecting head 1Z might become lower due to the influence of the foreign substance.

To overcome this issue, in the first embodiment, the piezoelectric body drive region RK1 and the piezoelectric body periphery region RG1 that are included in the piezoelectric body Qm are provided away from each other. That is, according to the first embodiment, the piezoelectric body drive region RK1, which is located over the pressure compartment CV1 and constitutes the piezoelectric element PZ1, and the piezoelectric body periphery region RG1, which is located under the wall WB1, are provided away from each other. Therefore, according to the first embodiment, as compared with the first reference example, it is possible to make the area of the piezoelectric body Qm smaller when viewed in the Z-axis direction. For this reason, according to the first embodiment, it is possible to make the possibility of entering of a foreign substance between the actuator substrate AT-Z and the sealing substrate 25 lower than that of the first reference example and, therefore, it is possible to reduce the possibility of a decrease in the performance of ejecting ink from the liquid ejecting head 1 due to the influence of the foreign substance having entered between the actuator substrate AT-Z and the sealing substrate 25.

Moreover, in the liquid ejecting head 1Z according to the first reference example, when the piezoelectric body drive region RZK1 of the piezoelectric body extending region RZ1 of the piezoelectric body QmZ vibrates due to the driving of the piezoelectric element PZ-Z1 by means of the drive signal Com, vibration that occurs at the piezoelectric body drive region RZK1 is transmitted to the piezoelectric body periphery region RZG1 via the piezoelectric body connection region RZM1. Then, in the first reference example, the vibration having been transmitted to the piezoelectric body periphery region RZG1 could cause displacement of the sealing substrate 25, which is located over the piezoelectric body periphery region RZG1, and the pressure compartment substrate 23, which is located under the piezoelectric body periphery region RZG1. When the displacement of the sealing substrate 25 occurs, the performance of sealing the piezoelectric element PZ-Z1 by the sealing space SP1 deteriorates. When the displacement of the pressure compartment substrate 23 occurs, the volume and shape of the pressure compartment CV1 changes and, therefore, the performance of ejecting ink from the liquid ejecting head 1Z deteriorates. As explained above, according to the first reference example, there is a high possibility that the vibration having been transmitted to the piezoelectric body periphery region RZG1 from the piezoelectric body drive region RZK1 via the piezoelectric body connection region RZM1 will result in a decrease in the performance of sealing the piezoelectric element PZ-Z1 and a decrease in the ejecting performance of the liquid ejecting head 1Z.

To overcome this issue, in the first embodiment, the piezoelectric body drive region RK1 and the piezoelectric body periphery region RG1 are provided away from each other as described above; therefore, as compared with the first reference example, it is possible to reduce the degree of transmission, to the piezoelectric body periphery region RG1, of vibration that occurs at the piezoelectric body drive region RK1 when the piezoelectric element PZ1 is driven by means of the drive signal Com. Therefore, according to the first embodiment, as compared with the first reference example, it is possible to reduce the deterioration of the performance of sealing the piezoelectric element PZ1 and reduce the deterioration of the ejecting performance of the liquid ejecting head 1.

Figure 10:
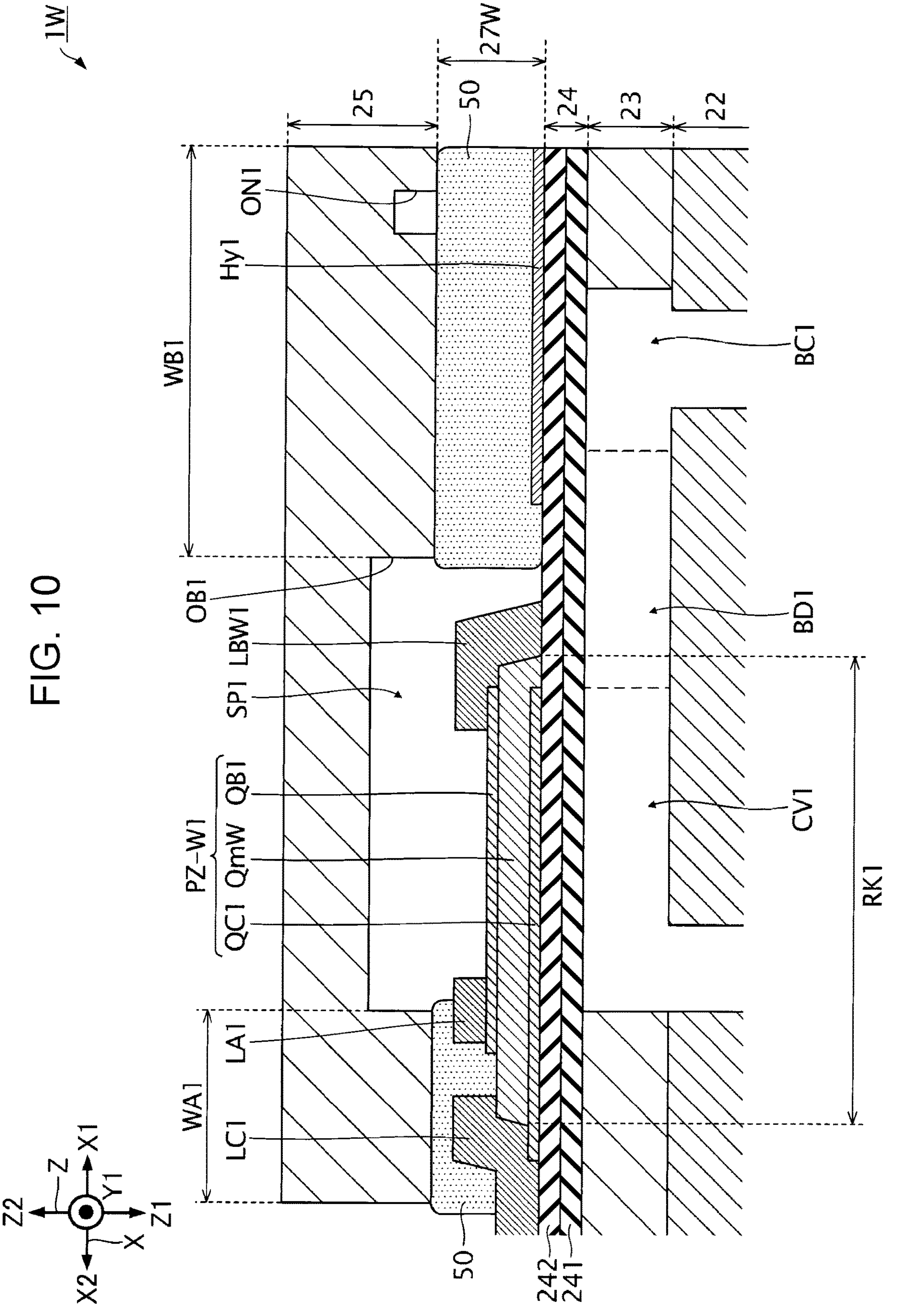
FIG. 10 is a close-sectional view of an example of the configuration of a liquid ejecting head according to a second reference example.
Figure 11:
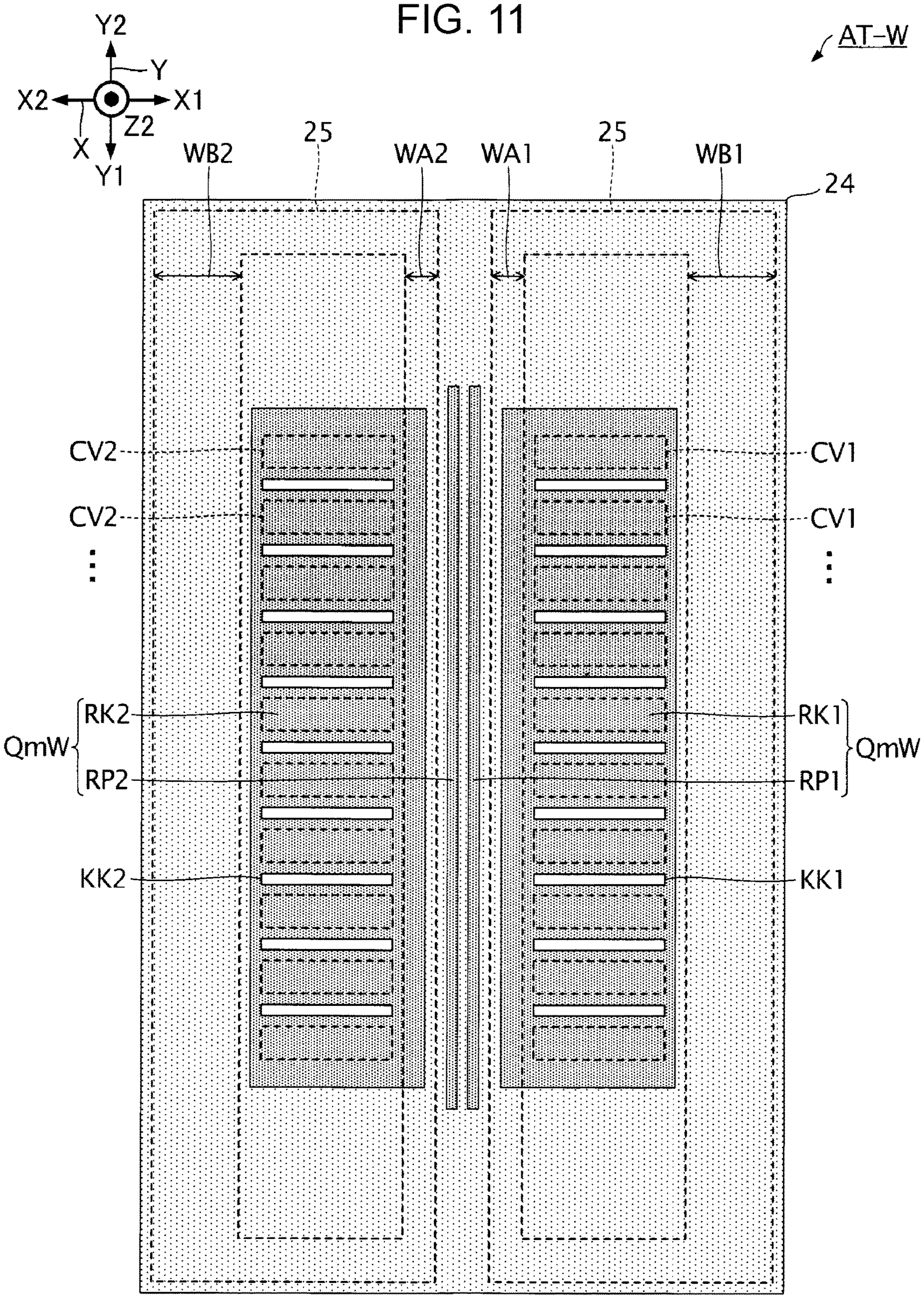
FIG. 11 is a plan view of an example of the configuration of an actuator substrate according to the second reference example.

FIG. 10 is a cross-sectional view of the liquid ejecting head 1W according to the second reference example, wherein the liquid ejecting head 1W is viewed in a cross-sectional manner in the Y2 direction. FIG. 11 is a plan view of an actuator substrate AT-W when the actuator substrate AT-W provided in the liquid ejecting head 1W is viewed in plan in the Z1 direction.

As illustrated in FIGS. 10 and 11, the liquid ejecting head 1W is different from the liquid ejecting head 1 according to the first embodiment in that it includes a piezoelectric structural body 27W including a piezoelectric body QmW in place of the piezoelectric structural body 27 including the piezoelectric body Qm. The piezoelectric body QmW is different from the piezoelectric body Qm according to the first embodiment in that it does not include the piezoelectric body periphery region RG1 correspondingly for the nozzle row Ln1. That is, the piezoelectric body QmW includes the piezoelectric body drive region RK1 and the piezoelectric body center region RP1 correspondingly for the nozzle row Ln1.

The liquid ejecting head 1W is different from the liquid ejecting head 1 according to the first embodiment in that it includes a piezoelectric element PZ-W1 in place of the piezoelectric element PZ1. The piezoelectric element PZ-W1 is different from the piezoelectric element PZ1 according to the first embodiment in that it includes the piezoelectric body QmW in place of the piezoelectric body Qm. The piezoelectric structural body 27W is different from the piezoelectric structural body 27 according to the first embodiment in that it includes an auxiliary electrode LBW1 layered on the piezoelectric body QmW in place of the auxiliary electrode LB1. The piezoelectric structural body 27W is different from the piezoelectric structural body 27 according to the first embodiment in that it does not include the auxiliary electrode Hx11, the auxiliary electrode Hx41, and the auxiliary electrode HC1.

It is assumed that the liquid ejecting head 1W has a substantially plane-symmetric structure with respect to a plane whose normal-line direction is the X-axis direction. Specifically, the liquid ejecting head 1W includes a piezoelectric element PZ-W2, which is an element symmetrical to the piezoelectric element PZ-W1, and an auxiliary electrode LBW2, which is an element symmetrical to the auxiliary electrode LBW1, correspondingly for the nozzle row Ln2. In the description below, the piezoelectric element PZ-W1 and the piezoelectric element PZ-W2 will sometimes be collectively referred to as “piezoelectric element PZ-W”, and the auxiliary electrode LBW1 and the auxiliary electrode LBW2 will sometimes be collectively referred to as “auxiliary electrode LBW”.

As explained above, in the liquid ejecting head 1W according to the second reference example, the piezoelectric body QmW includes the piezoelectric body drive region RK1 having a smaller area than the piezoelectric body periphery region RG1. For this reason, according to the second reference example, it is possible to reduce the possibility of entering of a foreign substance between the actuator substrate AT-W and the sealing substrate 25 in the process of bonding the actuator substrate AT-W and the sealing substrate 25 together by means of the adhesive layer 50, as compared with a mode in which the piezoelectric body QmZ that includes the piezoelectric body periphery region RZG1 having a large area is provided in the liquid ejecting head 1Z as in the first reference example.

However, as illustrated in FIG. 10, in the piezoelectric structural body 27W according to the second reference example, the piezoelectric body QmW, the individual wiring line LC1, and the auxiliary electrode LA1 are provided in addition to the adhesive layer 50 and the individual electrode QC1 under the wall WA1, whereas the adhesive layer 50 and the auxiliary layer Hy1 only are provided under the wall WB1. That is, in the second reference example, the thickness of the adhesive layer 50 under the wall WA1 is different from the thickness of the adhesive layer 50 under the wall WB1. Therefore, in the second reference example, the adhesive property of the piezoelectric structural body 27W and the sealing substrate 25 is lower than in the first reference example, and the strength of the actuator chip including the actuator substrate AT-W and the sealing substrate 25 is lower.

To overcome this issue, in the first embodiment, the piezoelectric body Qm includes the piezoelectric body periphery region RG1 in addition to the piezoelectric body drive region RK1. Moreover, in the first embodiment, the individual wiring line LC1 and the auxiliary electrode LA1 are provided on the piezoelectric body drive region RK1, and the auxiliary electrode LB1 is provided on the piezoelectric body periphery region RG1. For this reason, in the first embodiment, it is possible to make the thickness of the adhesive layer 50 under the wall WA1 and the thickness of the adhesive layer 50 under the wall WB1 substantially the same as each other. For this reason, in the first embodiment, it is possible to make the adhesive property of the piezoelectric structural body 27 and the sealing substrate 25 higher than in the second reference example, thereby making the strength of the actuator chip AC including the actuator substrate AT and the sealing substrate 25 higher.

As described above, according to the first embodiment, it is possible to achieve all of a reduction in the possibility of entering of a foreign substance between the actuator substrate AT and the sealing substrate 25, a reduction in the possibility of a decrease in the performance of sealing the piezoelectric element PZ1 by the sealing substrate 25, and a secured strength of the actuator chip AC.

A.5. Concluding Remarks Regarding First Embodiment

As explained above, the liquid ejecting head 1 according to the first embodiment includes: the pressure compartment substrate 23 in which the plurality of pressure compartments CV is provided, the plurality of pressure compartments CV including the pressure compartment CV1 extending in the X1 direction and the pressure compartment CV2 provided at a position different from a position of the pressure compartment CV1 in the X1 direction and extending in the X1 direction; the plurality of piezoelectric elements PZ disposed each at a Z2-side position as viewed from the pressure compartment substrate 23 and including the piezoelectric body Qm, the common electrode QB, and the individual electrode QC; and the sealing substrate 25 in which the recess OB1 and the recess OB2 are provided and which is disposed at a Z2-side position as viewed from the plurality of piezoelectric elements PZ, the recess OB1 housing the piezoelectric element PZ1 corresponding to the pressure compartment CV1 among the plurality of piezoelectric elements PZ, the recess OB2 housing the piezoelectric element PZ2 corresponding to the pressure compartment CV2 among the plurality of piezoelectric elements PZ, wherein, when the liquid ejecting head 1 is viewed in plan in the Z1 direction, the piezoelectric body Qm includes the piezoelectric body drive region RK1 overlapping with the pressure compartment CV1, the piezoelectric body periphery region RG1 overlapping with the wall WB1 of two walls that the recess OB1 includes in the X1 direction, the piezoelectric body drive region RK2 overlapping with the pressure compartment CV2, and the piezoelectric body periphery region RG2 overlapping with the wall WB2 of two walls that the recess OB2 includes in the X1 direction, in the X1 direction, the piezoelectric body drive region RK1 is located between the piezoelectric body periphery region RG1 and the piezoelectric body drive region RK2 and is provided away from the piezoelectric body periphery region RG1, and, in the X1 direction, the piezoelectric body drive region RK2 is located between the piezoelectric body drive region RK1 and the piezoelectric body periphery region RG2 and is provided away from the piezoelectric body periphery region RG2.

As stated here, with the liquid ejecting head 1 according to the first embodiment, since the piezoelectric body drive region RK1 and the piezoelectric body periphery region RG1 are provided away from each other, as compared with a mode in which the piezoelectric body drive region RK1 and the piezoelectric body periphery region RG1 are provided continuously, it is possible to reduce the possibility of entering of a foreign substance between the piezoelectric body Qm and the sealing substrate 25 and, moreover, even in a case where a foreign substance enters between the piezoelectric body Qm and the sealing substrate 25, it is possible to reduce the possibility that the foreign substance will cause a change in a relative positional relationship between the piezoelectric body Qm and the sealing substrate 25. For this reason, according to the first embodiment, as compared with the mode in which the piezoelectric body drive region RK1 and the piezoelectric body periphery region RG1 are provided continuously, it is possible to suppress a change in ejecting performance caused by the foreign substance entering between the piezoelectric body Qm and the sealing substrate 25. Moreover, according to the first embodiment, as compared with the mode in which the piezoelectric body drive region RK1 and the piezoelectric body periphery region RG1 are provided continuously, it is possible to suppress a change in a relative positional relationship between the piezoelectric body Qm and the sealing substrate 25 caused by the foreign substance entering between the piezoelectric body Qm and the sealing substrate 25 and thus to suppress a change in ejecting performance caused by the change in the relative positional relationship between the piezoelectric body Qm and the sealing substrate 25.

Furthermore, with the liquid ejecting head 1 according to the first embodiment, since the piezoelectric body drive region RK1 and the piezoelectric body periphery region RG1 are provided away from each other, as compared with the mode in which the piezoelectric body drive region RK1 and the piezoelectric body periphery region RG1 are provided continuously, it is possible to reduce the degree of transmission, to the piezoelectric body periphery region RG1, of vibration that occurs at the piezoelectric body drive region RK1 when the piezoelectric element PZ1 is driven by means of the drive signal Com. For this reason, according to the first embodiment, as compared with the mode in which the piezoelectric body drive region RK1 and the piezoelectric body periphery region RG1 are provided continuously, it is possible to reduce the possibility of displacement of the pressure compartment substrate 23 caused by the vibration of the piezoelectric body periphery region RG1 and thus to reduce the possibility of a change in the volume and shape of the pressure compartment CV1 caused by the displacement of the pressure compartment substrate 23. Therefore, according to the first embodiment, as compared with the mode in which the piezoelectric body drive region RK1 and the piezoelectric body periphery region RG1 are provided continuously, it is possible to suppress a change in ejecting performance of the liquid ejecting head 1 caused by the change in the volume and shape of the pressure compartment CV1.

In the first embodiment, the X1 direction is an example of “first direction”, the Z2 direction is an example of “over”, the pressure compartment CV1 is an example of “first pressure compartment”, the pressure compartment CV2 is an example of “second pressure compartment”, the common electrode QB is an example of “upper electrode”, the individual electrode QC is an example of “lower electrode”, the piezoelectric element PZ1 is an example of “first piezoelectric element”, the piezoelectric element PZ2 is an example of “second piezoelectric element”, the recess OB1 is an example of “first recess”, the recess OB2 is an example of “second recess”, the sealing substrate 25 is an example of “sealing plate”, the piezoelectric body drive region RK1 is an example of “first region”, the piezoelectric body periphery region RG1 is an example of “second region”, the piezoelectric body drive region RK2 is an example of “third region”, the piezoelectric body periphery region RG2 is an example of “fourth region”, the wall WB1 is an example of “one of two walls that the first recess includes”, and the wall WB2 is an example of “one of two walls that the second recess includes”.

In the first embodiment, a mode in which the liquid ejecting head 1 includes components corresponding to the nozzle row Ln1 and components corresponding to the nozzle row Ln2 has been described as an example; however, the scope of the present disclosure is not limited to this mode. The liquid ejecting head 1 may include components corresponding to a single nozzle row Ln. That is, the liquid ejecting head 1 according to the first embodiment may include: a pressure compartment substrate in which a first pressure compartment extending in a first direction is provided; a first piezoelectric element disposed over the pressure compartment substrate and including a piezoelectric body, an upper electrode, and a lower electrode; and a sealing plate which is disposed over the first piezoelectric element and in which a first recess housing the first piezoelectric element is provided, wherein, when the liquid ejecting head is viewed in plan in a vertical direction, the piezoelectric body may include a first region overlapping with the first pressure compartment, and a second region overlapping with one of two walls that the first recess includes in the first direction, and the first region may be provided away from the second region.

In the liquid ejecting head 1 according to the first embodiment, when the liquid ejecting head 1 is viewed in plan, the piezoelectric body drive region RK1 may overlap with the wall WA1 of the two walls that the recess OB1 includes in the X1 direction.

In the first embodiment, the wall WA1 is an example of “an other of the two walls that the first recess includes”.

In the liquid ejecting head 1 according to the first embodiment, the auxiliary electrode LA1 containing Au may be formed over at least a part of the piezoelectric body drive region RK1.

Having this feature, the liquid ejecting head 1 according to the first embodiment makes it possible to make the resistance of the common electrode QB1 provided on the piezoelectric body drive region RK1 low and thus to reduce the possibility that the potential of the common electrode QB1 will change from a desired potential. Therefore, the liquid ejecting head 1 according to the first embodiment makes it possible to suppress a decrease in ejecting performance of the liquid ejecting head 1 caused by the change in the potential of the common electrode QB1 from the desired potential.

In the first embodiment, the auxiliary electrode LA1 is an example of “conductive layer”.

In the liquid ejecting head 1 according to the first embodiment, the auxiliary layer Hy1 containing NiCr may be formed over at least a part of the piezoelectric body periphery region RG1.

Having this feature, the liquid ejecting head 1 according to the first embodiment makes it easier to bond the piezoelectric body Qm to the sealing substrate 25 by means of an adhesive as compared with a mode in which the auxiliary layer Hy1 is not provided over the piezoelectric body periphery region RG1.

In the liquid ejecting head 1 according to the first embodiment, a width of the piezoelectric body drive region RK1 in the X1 direction may be greater than a width of the piezoelectric body periphery region RG1 in the X1 direction.

Having this feature, the liquid ejecting head 1 according to the first embodiment makes it possible to make the amplitude of the piezoelectric body drive region RK1 larger when the piezoelectric element PZ1 is driven as compared with a mode in which the width of the piezoelectric body drive region RK1 in the X1 direction is less than the width of the piezoelectric body periphery region RG1 in the X1 direction, thereby ensuring good ejecting performance of the liquid ejecting head 1.

In the liquid ejecting head 1 according to the first embodiment, the piezoelectric body periphery region RG1 includes the middle portion RGm overlapping with the plurality of pressure compartments CV when the piezoelectric body periphery region RG1 is viewed in the X1 direction, and the both-end portion RGs not overlapping with the plurality of pressure compartments CV when the piezoelectric body periphery region RG1 is viewed in the X1 direction, and a width of the middle portion RGm in the X1 direction is greater than a width of the both-end portion RGs in the X1 direction.

Having this feature, the liquid ejecting head 1 according to the first embodiment makes it possible to secure the strength of the middle portion RGm, which is, of the piezoelectric body periphery region RG1, the portion to which vibration is transmitted from the piezoelectric body drive region RK1 when the piezoelectric element PZ is driven, as compared with a mode in which the width of the middle portion RGm in the X1 direction is less than the width of the both-end portion RGs in the X1 direction. Moreover, the liquid ejecting head 1 according to the first embodiment makes it possible to make the possibility of entering of a foreign substance between the piezoelectric body Qm and the sealing substrate 25 lower by reducing the area of the piezoelectric body Qm than the mode in which the width of the both-end portion RGs in the X1 direction is greater than the width of the middle portion RGm in the X1 direction. That is, with the liquid ejecting head 1 according to the first embodiment, it is possible to achieve both of a secured strength of the portion, of the piezoelectric body periphery region RG1, to which vibration is transmitted from the piezoelectric body drive region RK1 when the piezoelectric element PZ is driven and a reduction in the possibility of entering of a foreign substance between the piezoelectric body Qm and the sealing substrate 25 by reducing the area of the piezoelectric body Qm.

In the first embodiment, the middle portion RGm is an example of “first partial region”, and the both-end portion RGs is an example of “second partial region”.

In the liquid ejecting head 1 according to the first embodiment, the plurality of pressure compartments CV may include the plurality of pressure compartments CV1 arranged in the Y1 direction intersecting with the X1 direction, the piezoelectric body periphery region RG1 may include the extending portion RGx extending in the X1 direction and the extending portion RGy extending in the Y1 direction, the extending portion RGx may include a first extending partial region overlapping with the plurality of pressure compartments CV1 when the extending portion RGx is viewed in the Y1 direction, and the extending portion RGy may include the middle portion RGm (an example of “second extending partial region”) overlapping with the plurality of pressure compartments CV1 when the extending portion RGy is viewed in the X1 direction, and a width of the second extending partial region in the X1 direction is greater than a width of the first extending partial region in the Y1 direction.

Having this feature, the liquid ejecting head 1 according to the first embodiment makes it possible to secure the strength of the second extending partial region, which is, of the piezoelectric body periphery region RG1, the portion to which vibration is transmitted from the piezoelectric body drive region RK1 when the piezoelectric element PZ is driven, as compared with a mode in which the width of the second extending partial region in the X1 direction is less than the width of the first extending partial region in the Y1 direction. Moreover, the liquid ejecting head 1 according to the first embodiment makes it possible to make the possibility of entering of a foreign substance between the piezoelectric body Qm and the sealing substrate 25 lower by reducing the area of the piezoelectric body Qm than the mode in which the width of the first extending partial region in the Y1 direction is greater than the width of the second extending partial region in the X1 direction. That is, with the liquid ejecting head 1 according to the first embodiment, it is possible to achieve both of a secured strength of the portion, of the piezoelectric body periphery region RG1, to which vibration is transmitted from the piezoelectric body drive region RK1 when the piezoelectric element PZ is driven and a reduction in the possibility of entering of a foreign substance between the piezoelectric body Qm and the sealing substrate 25 by reducing the area of the piezoelectric body Qm.

In the first embodiment, the Y1 direction is an example of “second direction”, the extending portion RGx is an example of “first extending region”, and the extending portion RGy is an example of “second extending region”.

B. SECOND EMBODIMENT

Figure 12:
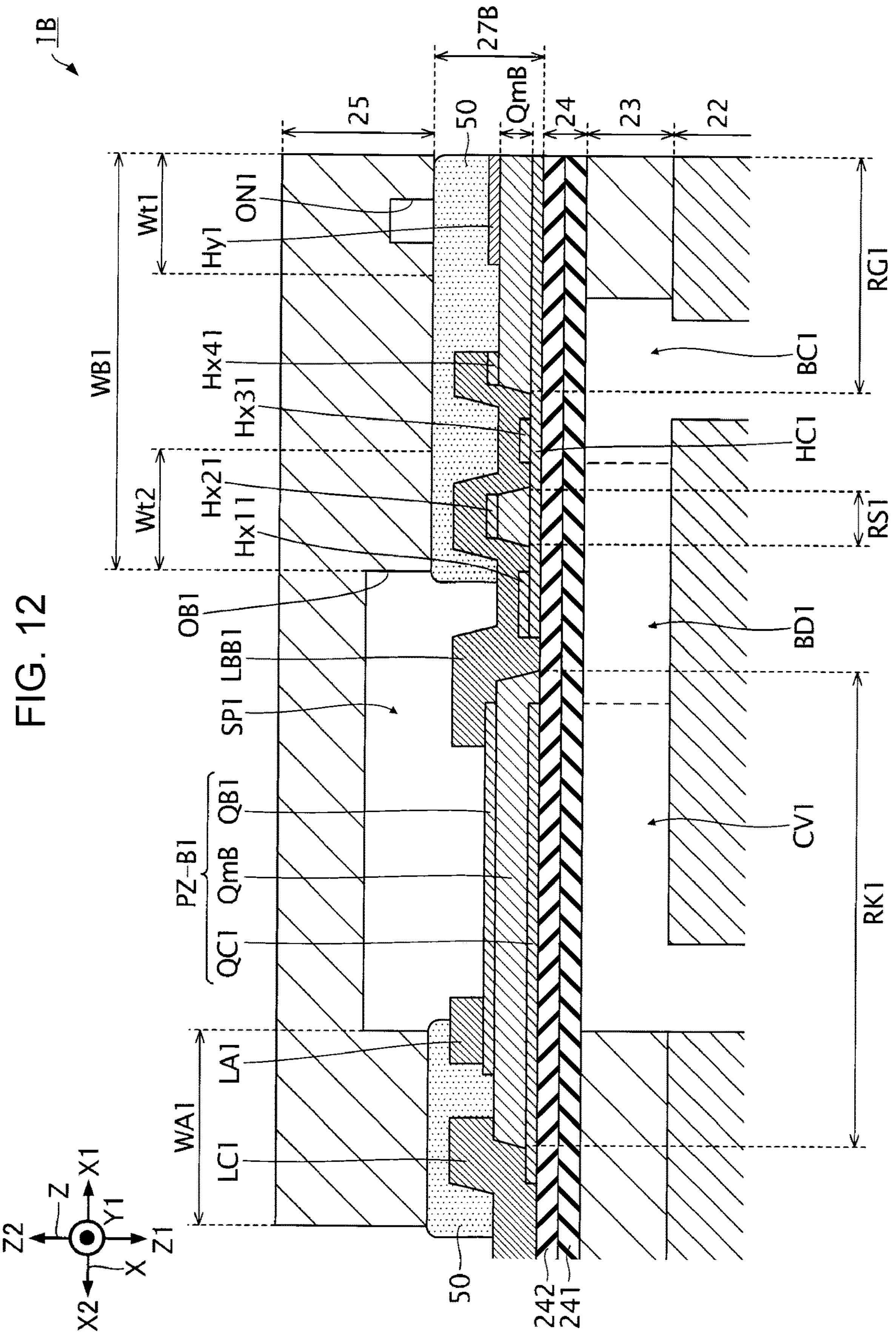
FIG. 12 is a close-sectional view of an example of the configuration of a liquid ejecting head according to a second embodiment of the present disclosure.
Figure 13:
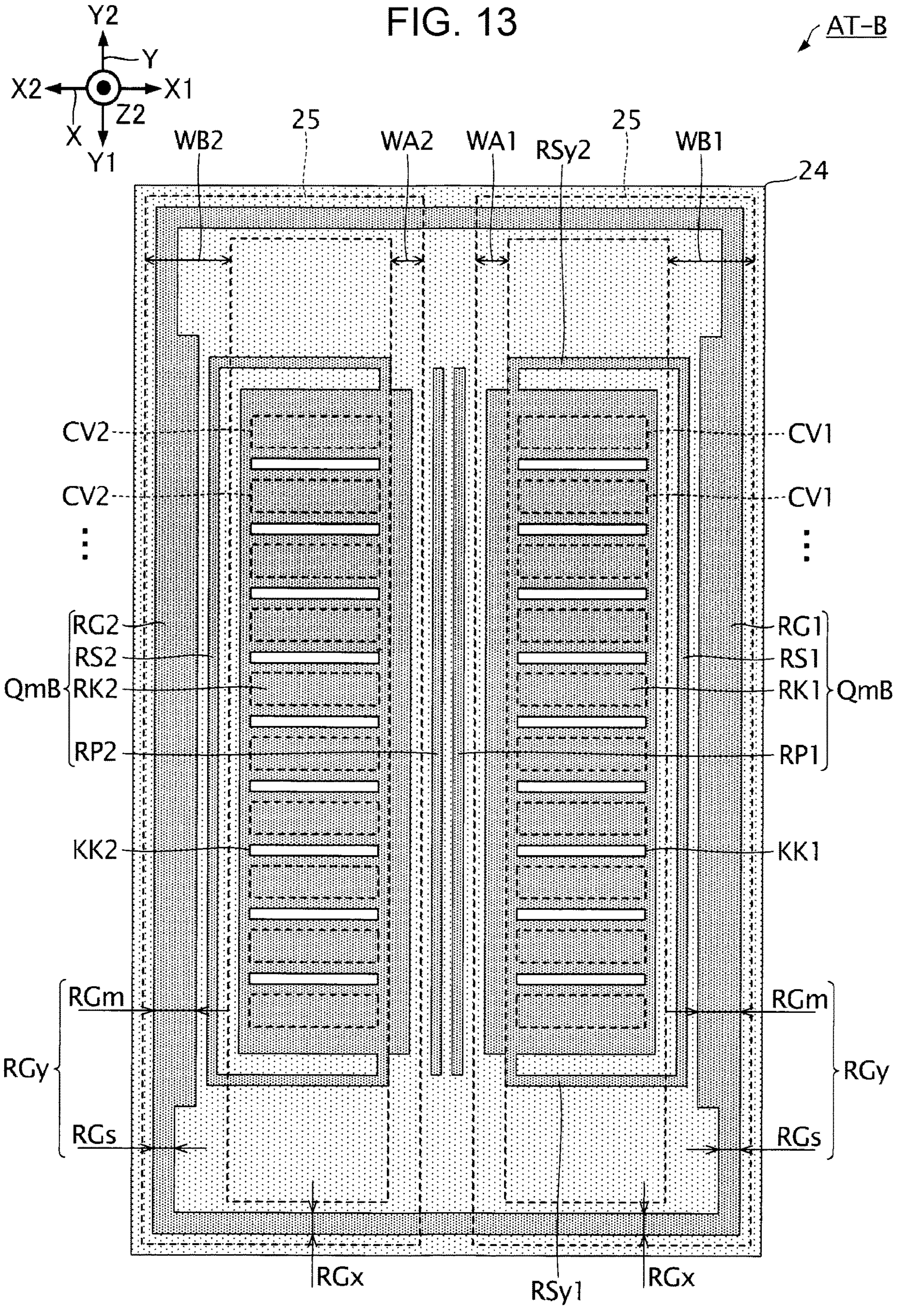
FIG. 13 is a plan view of an example of the configuration of an actuator substrate according to the second embodiment of the present disclosure.

With reference to FIGS. 12 and 13, a liquid ejecting apparatus according to a second embodiment will now be described. In each exemplary mode described below, the same reference numerals as those used in the description of the first embodiment are assigned to elements that are the same in operation and/or function as those in the first embodiment, and a detailed explanation of them is omitted.

B.1. Overview of Liquid Ejecting Head According to Second Embodiment

A liquid ejecting apparatus according to a second embodiment is different from the liquid ejecting apparatus 100 according to the first embodiment in that it includes a liquid ejecting head 1B in place of the liquid ejecting head 1.

FIG. 12 is a cross-sectional view of the liquid ejecting head 1B according to the second embodiment, wherein the liquid ejecting head 1B is viewed in a cross-sectional manner in the Y2 direction. FIG. 13 is a plan view of an actuator substrate AT-B when the actuator substrate AT-B provided in the liquid ejecting head 1B is viewed in plan in the Z1 direction.

As illustrated in FIGS. 12 and 13, the liquid ejecting head 1B is different from the liquid ejecting head 1 according to the first embodiment in that it includes a piezoelectric structural body 27B including a piezoelectric body QmB in place of the piezoelectric structural body 27 including the piezoelectric body Qm. The piezoelectric body QmB is different from the piezoelectric body Qm according to the first embodiment in that it further includes a piezoelectric body supporting region RS1 in addition to the piezoelectric body drive region RK1, the piezoelectric body periphery region RG1, and the piezoelectric body center region RP1 correspondingly for the nozzle row Ln1.

As illustrated in FIGS. 12 and 13, in the X-axis direction, the piezoelectric body supporting region RS1 is located between the piezoelectric body drive region RK1 and the piezoelectric body periphery region RG1 and is provided away from the piezoelectric body drive region RK1 and the piezoelectric body periphery region RG1.

The piezoelectric body supporting region RS1 is provided at a position where at least a part of the piezoelectric body supporting region RS1 overlaps with at least a part of the wall WB1 when the liquid ejecting head 1B is viewed in plan in the Z1 direction. In the description below, a region that includes the one, of two ends of the wall WB1 in the X-axis direction, located on the X1-directional side will be referred to as "end region Wt1", and a region that includes the other thereof located on the X2-directional side will be referred to as "end region Wt2". In the second embodiment, the piezoelectric body supporting region RS1 is provided at a position where at least a part of the piezoelectric body supporting region RS1 overlaps with at least a part of the end region Wt2 when the liquid ejecting head 1B is viewed in plan in the Z1 direction. The piezoelectric body periphery region RG1 is provided at a position where at least a part of the piezoelectric body periphery region RG1 overlaps with at least a part of the end region Wt1 when the liquid ejecting head 1B is viewed in plan in the Z1 direction. However, the scope of the present disclosure is not limited to this mode. The piezoelectric body supporting region RS1 may be provided at a position where the piezoelectric body supporting region RS1 does not overlap with the end region Wt2 when the liquid ejecting head 1B is viewed in plan in the Z1 direction. The piezoelectric body periphery region RG1 may be provided at a position where the piezoelectric body periphery region RG1 does not overlap with the end region Wt1 when the liquid ejecting head 1B is viewed in plan in the Z1 direction.

In the second embodiment, the following case is assumed as an example: the piezoelectric body supporting region RS1 is provided at a position where at least a part of the piezoelectric body supporting region RS1 overlaps with at least a part of the narrowed portion SB1 when the liquid ejecting head 1B is viewed in plan in the Z1 direction. However, the scope of the present disclosure is not limited to this mode. The piezoelectric body supporting region RS1 may be provided at a position where the piezoelectric body supporting region RS1 does not overlap with the narrowed portion SB1 when the liquid ejecting head 1B is viewed in plan in the Z1 direction.

Moreover, in the second embodiment, the following case is assumed as an example: the piezoelectric body QmB is provided such that the width of the piezoelectric body drive region RK1 in the X-axis direction is greater than the width of the piezoelectric body periphery region RG1 in the X-axis direction, and, in addition, the width of the piezoelectric body periphery region RG1 in the X-axis direction is greater than the width of the piezoelectric body supporting region RS1 in the X-axis direction. However, the width of the piezoelectric body periphery region RG1 in the X-axis direction may be equal to or less than the width of the piezoelectric body supporting region RS1 in the X-axis direction.

Furthermore, in the second embodiment, the following case is assumed as an example: as illustrated in FIG. 13, the piezoelectric body supporting region RS1 includes an extending portion RSy1 extending in the X-axis direction at a Y1-side position as viewed from the plurality of pressure compartments CV1 of the liquid ejecting head 1B and an extending portion RSy2 extending in the X-axis direction at a Y2-side position as viewed from the plurality of pressure compartments CV1 of the liquid ejecting head 1B. That is, in the second embodiment, it is assumed that the piezoelectric body supporting region RS1 is provided in such a way as to surround the plurality of pressure compartments CV1 of the liquid ejecting head 1B.

The liquid ejecting head 1B is different from the liquid ejecting head 1 according to the first embodiment in that it includes a piezoelectric element PZ-B1 in place of the piezoelectric element PZ1. The piezoelectric element PZ-B1 is different from the piezoelectric element PZ1 according to the first embodiment in that it includes the piezoelectric body QmB in place of the piezoelectric body Qm. The piezoelectric structural body 27B is different from the piezoelectric structural body 27 according to the first embodiment in that it includes an auxiliary electrode Hx21 layered on the piezoelectric body supporting region RS1, and an auxiliary electrode Hx31 layered on the auxiliary electrode HC1. Another difference of the piezoelectric structural body 27B from the piezoelectric structural body 27 according to the first embodiment is that it includes an auxiliary electrode LBB1 in place of the auxiliary electrode LB1. The auxiliary electrode LBB1 is layered on the common electrode QB1, the piezoelectric body QmB, the auxiliary electrode Hx11, the auxiliary electrode Hx21 provided on the piezoelectric body supporting region RS1, the auxiliary electrode Hx31, the auxiliary electrode Hx41 provided on the piezoelectric body periphery region RG1, and the auxiliary electrode HC1. It is sufficient as long as the auxiliary electrode LBB1 is layered on at least a part of the common electrode QB1 provided on the piezoelectric body drive region RK1 and at least a part of the auxiliary electrode Hx21 provided on the piezoelectric body supporting region RS1. The auxiliary electrode LBB1 is formed of a conductive material such as gold (Au), similarly to the auxiliary electrode LB1.

It is assumed that the liquid ejecting head 1B has a substantially plane-symmetric structure with respect to a plane whose normal-line direction is the X-axis direction. Specifically, the liquid ejecting head 1B includes a piezoelectric body supporting region RS2, which is an element symmetrical to the piezoelectric body supporting region RS1, a piezoelectric element PZ-B2, which is an element symmetrical to the piezoelectric element PZ-B1, and an auxiliary electrode LBB2, which is an element symmetrical to the auxiliary electrode LBB1, correspondingly for the nozzle row Ln2. In the description below, the piezoelectric body supporting region RS1 and the piezoelectric body supporting region RS2 will sometimes be collectively referred to as "piezoelectric body supporting region RS", the piezoelectric element PZ-B1 and the piezoelectric element PZ-B2 will sometimes be collectively referred to as "piezoelectric element PZ-B", and the auxiliary electrode LBB1 and the auxiliary electrode LBB2 will sometimes be collectively referred to as "auxiliary electrode LBB".

B.2. Concluding Remarks Regarding Second Embodiment

As explained above, the liquid ejecting head 1B according to the second embodiment includes: the pressure compartment substrate 23 in which the plurality of pressure compartments CV including the pressure compartment CV1 extending in the X1 direction is provided; the piezoelectric element PZ-B1 disposed at a Z2-side position as viewed from the pressure compartment substrate 23 in such a way as to correspond to the pressure compartment CV1 and including the piezoelectric body QmB, the common electrode QB, and the individual electrode QC; and the sealing substrate 25 in which the recess OB1 housing the piezoelectric element PZ-B1 is provided and which is disposed at a Z2-side position as viewed from the piezoelectric element PZ-B1, wherein, when the liquid ejecting head 1B is viewed in plan in the Z1 direction, the piezoelectric body QmB includes the piezoelectric body drive region RK1 extending from a position of overlapping with the pressure compartment CV1 to a position of overlapping with the wall WA1 of two walls that the recess OB1 includes in the X1 direction, the piezoelectric body periphery region RG1 overlapping with the wall WB1 of the two walls that the recess OB1 includes in the X1 direction, and the piezoelectric body supporting region RS1 overlapping with the wall WB1 of the two walls that the recess OB1 includes in the X1 direction, and, in the X1 direction, the piezoelectric body supporting region RS1 is located between the piezoelectric body drive region RK1 and the piezoelectric body periphery region RG1 and is provided away from the piezoelectric body drive region RK1 and the piezoelectric body periphery region RG1.

As stated here, with the liquid ejecting head 1B according to the second embodiment, since the piezoelectric body drive region RK1 and the piezoelectric body periphery region RG1 are provided away from each other, as compared with a mode in which the piezoelectric body drive region RK1 and the piezoelectric body periphery region RG1 are provided continuously, it is possible to reduce the possibility of entering of a foreign substance between the piezoelectric body QmB and the sealing substrate 25 and, moreover, even in a case where a foreign substance enters between the piezoelectric body QmB and the sealing substrate 25, it is possible to reduce the possibility that the foreign substance will cause a change in a relative positional relationship between the piezoelectric body QmB and the sealing substrate 25. For this reason, according to the second embodiment, similarly to the first embodiment, as compared with the mode in which the piezoelectric body drive region RK1 and the piezoelectric body periphery region RG1 are provided continuously, it is possible to suppress a change in ejecting performance caused by the foreign substance entering between the piezoelectric body QmB and the sealing substrate 25.

Furthermore, with the liquid ejecting head 1B according to the second embodiment, since the piezoelectric body drive region RK1 and the piezoelectric body periphery region RG1 are provided away from each other, as compared with the mode in which the piezoelectric body drive region RK1 and the piezoelectric body periphery region RG1 are provided continuously, it is possible to reduce the degree of transmission, to the piezoelectric body periphery region RG1, of vibration that occurs at the piezoelectric body drive region RK1 when the piezoelectric element PZ-B1 is driven by means of the drive signal Com. For this reason, according to the second embodiment, similarly to the first embodiment, as compared with the mode in which the piezoelectric body drive region RK1 and the piezoelectric body periphery region RG1 are provided continuously, it is possible to reduce the possibility of displacement of the pressure compartment substrate 23 caused by the vibration of the piezoelectric body periphery region RG1 and thus to reduce the possibility of a change in the volume and shape of the pressure compartment CV1 caused by the displacement of the pressure compartment substrate 23.

Furthermore, with the liquid ejecting head 1B according to the second embodiment, since the piezoelectric body QmB includes the piezoelectric body supporting region RS1, as compared with the mode without the piezoelectric body supporting region RS1, it is easier for pressure to transmit from the piezoelectric body QmB to the sealing substrate 25 in a step of bonding the actuator substrate AT-B including the piezoelectric body QmB to the sealing substrate 25 or in a step of bonding the actuator chip including the actuator substrate AT-B and the sealing substrate 25 to another member such as the communication plate 22, thereby realizing reliable bonding in each bonding step.

In the second embodiment, the X1 direction is an example of “first direction”, the pressure compartment CV1 is an example of “first pressure compartment”, the Z2 direction is an example of “over”, the common electrode QB is an example of “upper electrode”, the individual electrode QC is an example of “lower electrode”, the piezoelectric element PZ-B1 is an example of “first piezoelectric element”, the recess OB1 is an example of “first recess”, the sealing substrate 25 is an example of “sealing plate”, the piezoelectric body drive region RK1 is an example of “first region”, the piezoelectric body periphery region RG1 is an example of “second region”, the piezoelectric body supporting region RS1 is an example of “fifth region”, the wall WA1 is an example of “one of two walls that the first recess includes”, and the wall WB1 is an example of “an other of the two walls that the first recess includes”.

In the liquid ejecting head 1B according to the second embodiment, the piezoelectric body supporting region RS1 may overlap with the end region Wt2 that is a region of, of ends of the wall WB1, one located closer to the recess OB1 when the liquid ejecting head 1 is viewed in plan.

As stated here, in the liquid ejecting head 1B according to the second embodiment, since the piezoelectric body supporting region RS1 overlaps with the end region Wt2 of the wall WB1, as compared with a mode in which the piezoelectric body supporting region RS1 does not overlap with the wall WB, it is easier for pressure to transmit from the piezoelectric body QmB to the sealing substrate 25, thereby realizing reliable bonding in each bonding step.

In the liquid ejecting head 1B according to the second embodiment, the auxiliary electrode LA1 containing Au may be formed over at least a part of the piezoelectric body drive region RK1, and the auxiliary electrode LBB1 containing Au may be formed over at least a part of the piezoelectric body supporting region RS1.

Having this feature, the liquid ejecting head 1B according to the second embodiment makes it possible to make the resistance of the common electrode QB1 provided on the piezoelectric body drive region RK1 low and thus to reduce the possibility that the potential of the common electrode QB1 will change from a desired potential. Therefore, the liquid ejecting head 1B according to the second embodiment makes it possible to suppress a decrease in ejecting performance of the liquid ejecting head 1B caused by the change in the potential of the common electrode QB1 from the desired potential.

In the second embodiment, the auxiliary electrode LA1 is an example of “first conductive layer”, and the auxiliary electrode LBB1 is an example of “second conductive layer”.

In the liquid ejecting head 1B according to the second embodiment, the auxiliary layer Hy1 containing NiCr may be formed over at least a part of the piezoelectric body periphery region RG1.

Having this feature, the liquid ejecting head 1B according to the second embodiment makes it easier to bond the piezoelectric body QmB to the sealing substrate 25 by means of an adhesive as compared with a mode in which the auxiliary layer Hy1 is not provided over the piezoelectric body periphery region RG1.

In the liquid ejecting head 1B according to the second embodiment, a width of the piezoelectric body drive region RK1 in the X1 direction may be greater than a width of the piezoelectric body periphery region RG1 in the X1 direction, and the width of the piezoelectric body periphery region RG1 in the X1 direction may be greater than a width of the piezoelectric body supporting region RS1 in the X1 direction.

Having this feature, the liquid ejecting head 1B according to the second embodiment makes it possible to bond the piezoelectric body QmB to the sealing substrate 25 more securely than in a mode in which the width of the piezoelectric body periphery region RG1 in the X1 direction is less than the width of the piezoelectric body supporting region RS1 in the X1 direction.

In the liquid ejecting head 1B according to the second embodiment, the plurality of pressure compartments CV may include the plurality of pressure compartments CV1 arranged in the Y1 direction intersecting with the X1 direction, and the piezoelectric body supporting region RS1 may extend in such a way as to surround the plurality of pressure compartments CV1.

Having this feature, as compared with a mode in which the piezoelectric body supporting region RS1 is disposed on one directional side only as viewed from the plurality of pressure compartments CV1, the liquid ejecting head 1B according to the second embodiment makes it easier for pressure to transmit from the piezoelectric body QmB to the sealing substrate 25 in a step of bonding the actuator substrate AT-B including the piezoelectric body QmB to the sealing substrate 25 or in a step of bonding the actuator chip including the actuator substrate AT-B and the sealing substrate 25 to another member such as the communication plate 22, thereby realizing reliable bonding in each bonding step.

In the second embodiment, the Y1 direction is an example of “second direction”.

In the liquid ejecting head 1B according to the second embodiment, the pressure compartment substrate 23 may include the narrowed portion SB1 defining a wall surface of the communication flow passage BD1 having a sectional area smaller than a sectional area of the communication flow passage BC1 and smaller than a sectional area of the pressure compartment CV1, the communication flow passage BC1 to which ink is supplied may be in communication with the pressure compartment CV1 via the communication flow passage BD1, and the piezoelectric body supporting region RS1 may overlap with the narrowed portion SB1 when the liquid ejecting head 1B is viewed in plan.

Having this feature, as compared with a mode in which the piezoelectric body supporting region RS1 does not overlap with the narrowed portion SB1, the liquid ejecting head 1B according to the second embodiment makes it easier for pressure to transmit from the piezoelectric body QmB to the sealing substrate 25 in a step of bonding the actuator substrate AT-B including the piezoelectric body QmB to the sealing substrate 25 or in a step of bonding the actuator chip including the actuator substrate AT-B and the sealing substrate 25 to another member such as the communication plate 22, thereby realizing reliable bonding in each bonding step.

In the second embodiment, ink is an example of “liquid”, the communication flow passage BC1 is an example of “supply compartment”, and the communication flow passage BD1 is an example of “communication neck”.

C. VARIATION EXAMPLES

The embodiments described as examples above can be modified in various ways. Some specific examples of modification are described below. Any two or more variation examples selected from among the examples described below may be combined as long as they are not contradictory to each other or one another.

First Variation Example

The liquid ejecting apparatus may include a liquid ejecting head 1C in place of the liquid ejecting head 1 or the liquid ejecting head 1B described above.

Figure 14:
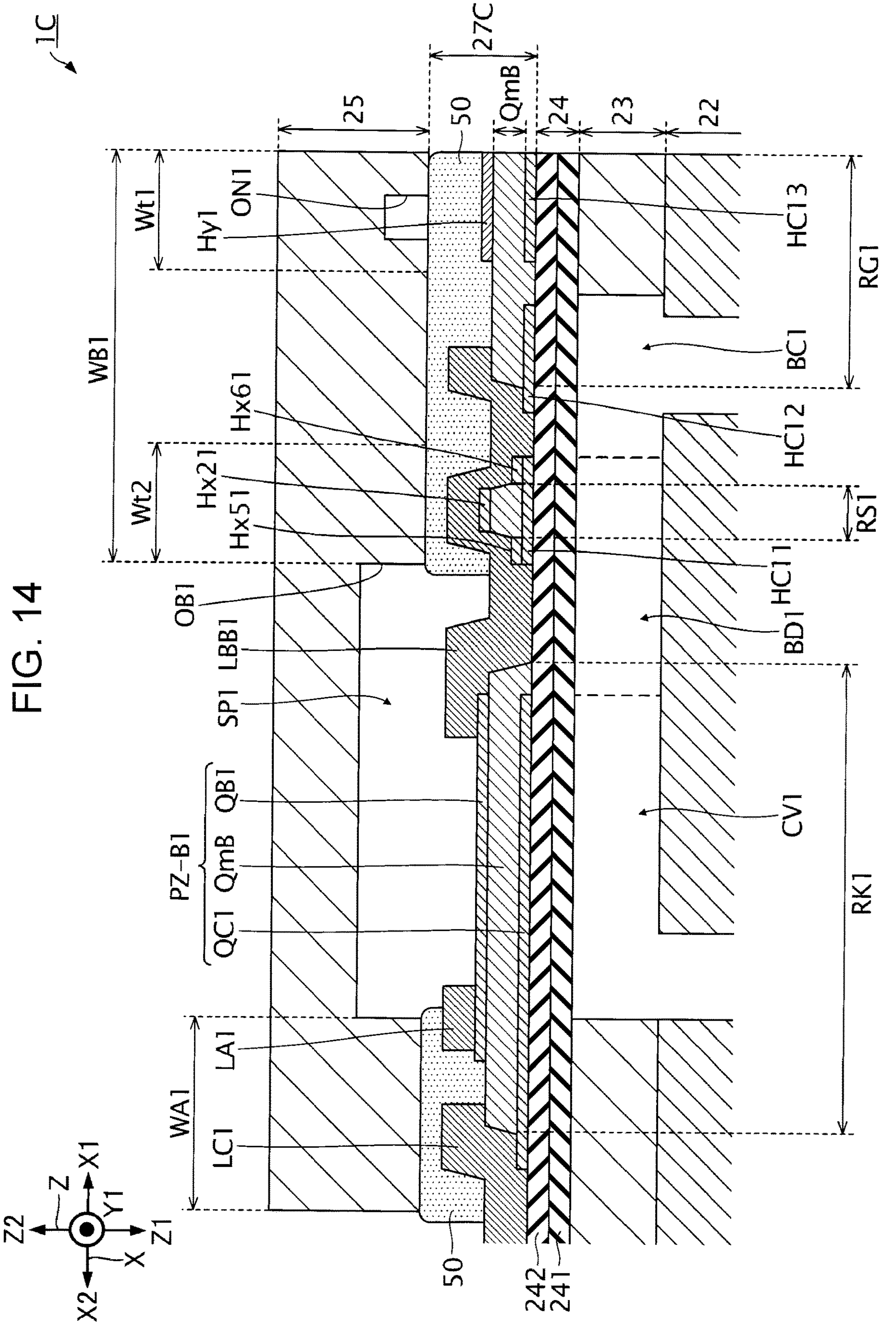
FIG. 14 is a close-sectional view of an example of the configuration of a liquid ejecting head according to a first variation example of the present disclosure.

FIG. 14 is a cross-sectional view of the liquid ejecting head 1C according to the present variation example, wherein the liquid ejecting head 1C is viewed in a cross-sectional manner in the Y2 direction.

As illustrated in FIG. 14, the liquid ejecting head 1C is different from the liquid ejecting head 1B according to the second embodiment in that it includes a piezoelectric structural body 27C in place of the piezoelectric structural body 27B. The piezoelectric structural body 27C is different from the piezoelectric structural body 27B according to the second embodiment in that it includes an auxiliary electrode Hx51, an auxiliary electrode Hx61, an auxiliary electrode HC11, an auxiliary electrode HC12, and an auxiliary layer HC13 and does not include the auxiliary electrode Hx11, the auxiliary electrode Hx31, the auxiliary electrode Hx41, and the auxiliary electrode HC1. The auxiliary electrode HC11, the auxiliary electrode HC12, and the auxiliary layer HC13 are formed of, for example, the same material as that of the individual electrode QC1. The auxiliary electrode Hx51 and the auxiliary electrode Hx61 are formed of, for example, the same material as that of the common electrode QB1. The auxiliary electrode HC11 is provided on the insulating layer 242 in a region including the piezoelectric body supporting region RS1. The auxiliary electrode HC12 is provided on the insulating layer 242 in the piezoelectric body periphery region RG1. The auxiliary layer HC13 is provided on the insulating layer 242 in the piezoelectric body periphery region RG1 at an X1-side position as viewed from the auxiliary electrode HC12 in a state of being insulated from the auxiliary electrode HC12. The auxiliary electrode Hx51 is provided on the auxiliary electrode HC11 between the piezoelectric body supporting region RS1 and the piezoelectric body drive region RK1. The auxiliary electrode Hx61 is provided on the auxiliary electrode HC11 between the piezoelectric body supporting region RS1 and the piezoelectric body periphery region RG1.

Also in the present variation example, since the piezoelectric body drive region RK1 and the piezoelectric body periphery region RG1 are provided away from each other, as compared with the mode in which the piezoelectric body drive region RK1 and the piezoelectric body periphery region RG1 are provided continuously, it is possible to reduce the degree of transmission, to the piezoelectric body periphery region RG1, of vibration that occurs at the piezoelectric body drive region RK1 when the piezoelectric element PZ-B1 is driven by means of the drive signal Com.

Second Variation Example

In the first embodiment, the second embodiment, and the first variation example described above, a serial-type liquid ejecting apparatus that reciprocates, in the X-axis direction, the housing case 921 in which the liquid ejecting heads 1, the liquid ejecting heads 1B, or the liquid ejecting heads 1C are mounted has been taken as an example. However, the scope of the present disclosure is not limited to this mode. The liquid ejecting apparatus may be a so-called line-type liquid ejecting apparatus in which the plural nozzles N are arranged throughout the entire width of the medium PP.

Third Variation Example

The liquid ejecting apparatus according to the first embodiment, the second embodiment, the first variation example, and the second variation example described above can be applied to various kinds of equipment such as facsimiles and copiers, etc. in addition to print-only machines. The scope of application and use of the liquid ejecting apparatus according to the present disclosure is not limited to printing. For example, a liquid ejecting apparatus that ejects a colorant solution can be used as an apparatus for manufacturing a color filter of a liquid crystal display device. A liquid ejecting apparatus that ejects a solution of a conductive material can be used as a manufacturing apparatus for forming wiring lines and electrodes of a wiring substrate.

What is claimed is:

1. A liquid ejecting head, comprising:

a pressure compartment substrate in which a plurality of pressure compartments is provided, the plurality of pressure compartments including a first pressure compartment extending in a first direction and a second pressure compartment provided at a position different from a position of the first pressure compartment in the first direction and extending in the first direction;

a plurality of piezoelectric elements disposed over the pressure compartment substrate and including a piezoelectric body, an upper electrode, and a lower electrode; and a sealing plate in which a first recess and a second recess are provided and which is disposed over the plurality of piezoelectric elements, the first recess housing a first piezoelectric element corresponding to the first pressure compartment among the plurality of piezoelectric elements, the second recess housing a second piezoelectric element corresponding to the second pressure compartment among the plurality of piezoelectric elements, wherein when the liquid ejecting head is viewed in plan in a vertical direction, the piezoelectric body includes a first region overlapping with the first pressure compartment, a second region overlapping with one of two walls that the first recess includes in the first direction, a third region overlapping with the second pressure compartment, and a fourth region overlapping with one of two walls that the second recess includes in the first direction, in the first direction, the first region is located between the second region and the third region and is provided away from the second region, and in the first direction, the third region is located between the first region and the fourth region and is provided away from the fourth region.

2. The liquid ejecting head according to claim 1, wherein when the liquid ejecting head is viewed in plan, the first region overlaps with an other of the two walls that the first recess includes in the first direction.

3. The liquid ejecting head according to claim 2, wherein a conductive layer containing Au is formed over at least a part of the first region.

4. The liquid ejecting head according to claim 2, wherein an auxiliary layer containing NiCr is formed over at least a part of the second region.

5. The liquid ejecting head according to claim 1, wherein a width of the first region in the first direction is greater than a width of the second region in the first direction.

6. The liquid ejecting head according to claim 1, wherein the second region includes a first partial region overlapping with the plurality of pressure compartments when the second region is viewed in the first direction, and a second partial region not overlapping with the plurality of pressure compartments when the second region is viewed in the first direction, and a width of the first partial region in the first direction is greater than a width of the second partial region in the first direction.

7. The liquid ejecting head according to claim 1, wherein the plurality of pressure compartments includes a plurality of first pressure compartments arranged in a second direction intersecting with the first direction, each of the plurality of first pressure compartments being the first pressure compartment, the second region includes a first extending region extending in the first direction, and a second extending region extending in the second direction, the first extending region includes a first extending partial region overlapping with the plurality of first pressure compartments when the first extending region is viewed in the second direction, the second extending region includes a second extending partial region overlapping with the plurality of first pressure compartments when the second extending region is viewed in the first direction, and a width of the second extending partial region in the first direction is greater than a width of the first extending partial region in the second direction.

8. A liquid ejecting apparatus, comprising:

the liquid ejecting head according to claim 1.

* * * * *